US008271604B2

(12) United States Patent
Freimuth et al.

(10) Patent No.: US 8,271,604 B2
(45) Date of Patent: Sep. 18, 2012

(54) INITIALIZING SHARED MEMORIES FOR SHARING ENDPOINTS ACROSS A PLURALITY OF ROOT COMPLEXES

(75) Inventors: Douglas M. Freimuth, New York, NY (US); Renato J. Recio, Austin, TX (US); Claudia A. Salzberg, Austin, TX (US); Steven M. Thurber, Austin, TX (US); Jacobo A. Vargas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 11/612,522

(22) Filed: Dec. 19, 2006

(65) Prior Publication Data

US 2008/0147959 A1    Jun. 19, 2008

(51) Int. Cl.
*G06F 15/167* (2006.01)
*G06F 15/16* (2006.01)
*G06F 3/00* (2006.01)

(52) U.S. Cl. ............................. 709/213; 709/245; 710/9
(58) Field of Classification Search .......... 709/213–216, 709/245; 710/3–4, 9, 26
See application file for complete search history.

(56) References Cited

U.S. PATENT DOCUMENTS

| | | | |
|---|---|---|---|
| 4,769,769 A | 9/1988 | Bolt et al. | |
| 5,784,576 A | 7/1998 | Guthrie et al. | |
| 5,875,308 A | 2/1999 | Egan et al. | |
| 5,911,001 A | 6/1999 | Kawada | |
| 5,930,496 A | 7/1999 | MacLaren et al. | |
| 6,070,207 A | 5/2000 | Bell | |
| 6,125,114 A | 9/2000 | Blanc et al. | |
| 6,185,642 B1 | 2/2001 | Beukema et al. | |
| 6,189,058 B1 | 2/2001 | Jones, III et al. | |
| 6,289,405 B1 | 9/2001 | Movall et al. | |
| 6,505,263 B1 | 1/2003 | Larson et al. | |
| 6,684,281 B1 | 1/2004 | Sugahara et al. | |
| 6,864,886 B1 | 3/2005 | Cavallaro et al. | |
| 6,954,813 B2 | 10/2005 | Holly, III et al. | |
| 6,968,414 B2 | 11/2005 | Abbondanzio et al. | |
| 7,028,125 B2 | 4/2006 | Lee | |
| 7,103,888 B1 | 9/2006 | Cayton et al. | |

(Continued)

OTHER PUBLICATIONS

U.S. Appl. No. 11/612,526, filed Dec. 19, 2006, Freimuth et al.

(Continued)

*Primary Examiner* — Liangche A Wang
*Assistant Examiner* — Sherman Lin
(74) *Attorney, Agent, or Firm* — Stephen R. Tkacs; Stephen J. Walder, Jr.; Libby Z. Toub

(57) ABSTRACT

A mechanism for initializing shared memories for sharing endpoints across a plurality of root complexes is provided. A multi-root PCIe manager (MR-PCIM) initializes the shared memory between root complexes and endpoints by discovering the PCIe switch fabric by traversing all the links accessible through the interconnected switches of the PCIe switch fabric. As the links are traversed, the MR-PCIM compares information obtained for each of the root complexes and endpoints to determine which endpoints and root complexes reside on the same blade. A virtual PCIe tree data structure is then generated that ties the endpoints available on the PCIe switch fabric to each root complex. The MR-PCIM, or a single-root PCIe manager (SR-PCIM), may then assign each endpoint and root complex a base and limit within the PCIe memory address space the endpoint belongs to.

35 Claims, 25 Drawing Sheets

U.S. PATENT DOCUMENTS

| | | | |
|---|---|---|---|
| 7,133,958 | B1 | 11/2006 | Kuskin |
| 7,174,407 | B2 | 2/2007 | Hou et al. |
| 7,308,523 | B1 | 12/2007 | Ngai |
| 7,502,884 | B1 | 3/2009 | Shah et al. |
| 7,529,860 | B2 | 5/2009 | Freimuth et al. |
| 7,657,663 | B2 | 2/2010 | Freimuth et al. |
| 2002/0078308 | A1* | 6/2002 | Altman et al. ............... 711/147 |
| 2002/0191627 | A1 | 12/2002 | Subbiah et al. |
| 2002/0194407 | A1 | 12/2002 | Kim |
| 2003/0065752 | A1 | 4/2003 | Kaushik et al. |
| 2003/0065856 | A1 | 4/2003 | Kagan et al. |
| 2003/0163755 | A1 | 8/2003 | Fung et al. |
| 2003/0204648 | A1 | 10/2003 | Arndt |
| 2003/0208642 | A1 | 11/2003 | Desai et al. |
| 2004/0019729 | A1 | 1/2004 | Kelley et al. |
| 2004/0039892 | A1* | 2/2004 | Goldschmidt ............... 711/170 |
| 2004/0049601 | A1 | 3/2004 | Boyd et al. |
| 2004/0059807 | A1 | 3/2004 | Klotz et al. |
| 2004/0073742 | A1 | 4/2004 | Arimilli et al. |
| 2004/0215569 | A1* | 10/2004 | Agha et al. ..................... 705/57 |
| 2005/0238035 | A1* | 10/2005 | Riley ............................ 370/401 |
| 2005/0246460 | A1 | 11/2005 | Stufflebeam |
| 2006/0101186 | A1 | 5/2006 | Lee |
| 2006/0161419 | A1 | 7/2006 | Herrell et al. |
| 2006/0242333 | A1* | 10/2006 | Johnsen et al. ................ 710/30 |
| 2006/0242354 | A1 | 10/2006 | Johnsen et al. |
| 2006/0253619 | A1* | 11/2006 | Torudbakken et al. ........ 710/31 |
| 2006/0277348 | A1 | 12/2006 | Wooten |
| 2006/0281541 | A1 | 12/2006 | Nguyen et al. |
| 2007/0097949 | A1 | 5/2007 | Boyd et al. |
| 2007/0130407 | A1* | 6/2007 | Olson et al. .................. 710/305 |
| 2007/0266179 | A1 | 11/2007 | Chavan et al. |
| 2007/0294444 | A1 | 12/2007 | Panesar |
| 2008/0005415 | A1 | 1/2008 | Lopez et al. |
| 2008/0005706 | A1 | 1/2008 | Sharma et al. |
| 2008/0025289 | A1 | 1/2008 | Kapur et al. |
| 2008/0034147 | A1 | 2/2008 | Stubbs et al. |
| 2008/0040463 | A1 | 2/2008 | Brown et al. |
| 2008/0126778 | A1 | 5/2008 | Bishop et al. |
| 2008/0259555 | A1 | 10/2008 | Bechtolsheim et al. |
| 2008/0313364 | A1 | 12/2008 | Flynn et al. |

OTHER PUBLICATIONS

U.S. Appl. No. 11/612,530, filed Dec. 19, 2006, Freimuth et al.
U.S. Appl. No. 11/612,535, filed Dec. 19, 2006, Freimuth et al.
U.S. Appl. No. 11/612,538, filed Dec. 19, 2006, Freimuth et al.
U.S. Appl. No. 11/612,543, filed Dec. 19, 2006, Freimuth et al.
U.S. Appl. No. 11/612,547, filed Dec. 19, 2006, Freimuth et al.
U.S. Appl. No. 11/612,555, filed Dec. 19, 2006, Freimuth et al.
U.S. Appl. No. 11/612,562, filed Dec. 19, 2006, Freimuth et al.
USPTO U.S. Appl. No. 11/612,526.
USPTO U.S. Appl. No. 11/612,530.
USPTO U.S. Appl. No. 11/612,535.
USPTO U.S. Appl. No. 11/612,538.
USPTO U.S. Appl. No. 11/612,543.
USPTO U.S. Appl. No. 11/612,547.
USPTO U.S. Appl. No. 11/612,555.
USPTO U.S. Appl. No. 11/612,562.
"Intel Virtualization Technology for Directed I/O Architecture Specification", Intel, Feb. 2006, pp. 1-106.
Krause, Michael et al., "I/O Virtualization and Sharing", Microsoft Corporation, 2006, pp. 1-26.
Mihalis, Zack, "PCI Express gains I/O virtualization", Network World, Jul. 24, 2006, pp. 1-2.
Recto, Renato, "System IO Network Evolution, Closing the Requirement Gaps", IBM Corporation, 2006, pp. 1-14.
Notice of Allowance mailed Apr. 16, 2010 for U.S. Appl. No. 11/612,526, 11 pages.
Office Action mailed on Mar. 22, 2010 for U.S. Appl. No. 11/612,535, 36 pages.
Examiner's Request for Information mailed Jul. 21, 2010 for U.S. Appl. No. 11/612,538; 4 pages.
Interview Summary mailed May 14, 2010 for U.S. Appl. No. 11/612,543; 4 pages.
Notice of Allowance mailed May 28, 2010 for U.S. Appl. No. 11/612,547; 12 pages.
Notice of Allowance mailed Jul. 8, 2010 for U.S. Appl. No. 11/612,543; 5 pages.
Notice of Allowance mailed Jul. 12, 2010 for U.S. Appl. No. 11/612,526; 14 pages.
Response to Office Action filed with the USPTO on Apr. 29, 2010 for U.S. Appl. No. 11/612,538; 20 pages.
Response to Office Action filed with the USPTO on May 14, 2010 for U.S. Appl. No. 11/612,543; 11 pages.
Response to Office Action filed with the USPTO on Jun. 15, 2010 for U.S. Appl. No. 11/612,535; 13 pages.
Notice of Allowance mailed Aug. 16, 2010 for U.S. Appl. No. 11/612,530; 17 pages.
Office Action mailed Sep. 15, 2010 for U.S. Appl. No. 11/612,535; 50 pages.
Response to Examiner's Request for Information filed with the USPTO on Sep. 13, 2010 for U.S. Appl. No. 11/612,538, 5 pages.
Notice of Allowance mailed Feb. 28, 2011 for U.S. Appl. No. 11/612,538; 14 pages.
Response to Office Action filed Dec. 15, 2010, U.S. Appl. No. 11/612,535, 23 pages.
Notice of Allowance mailed Mar. 16, 2011 for U.S. Appl. No. 11/612,535; 20 pages.

* cited by examiner

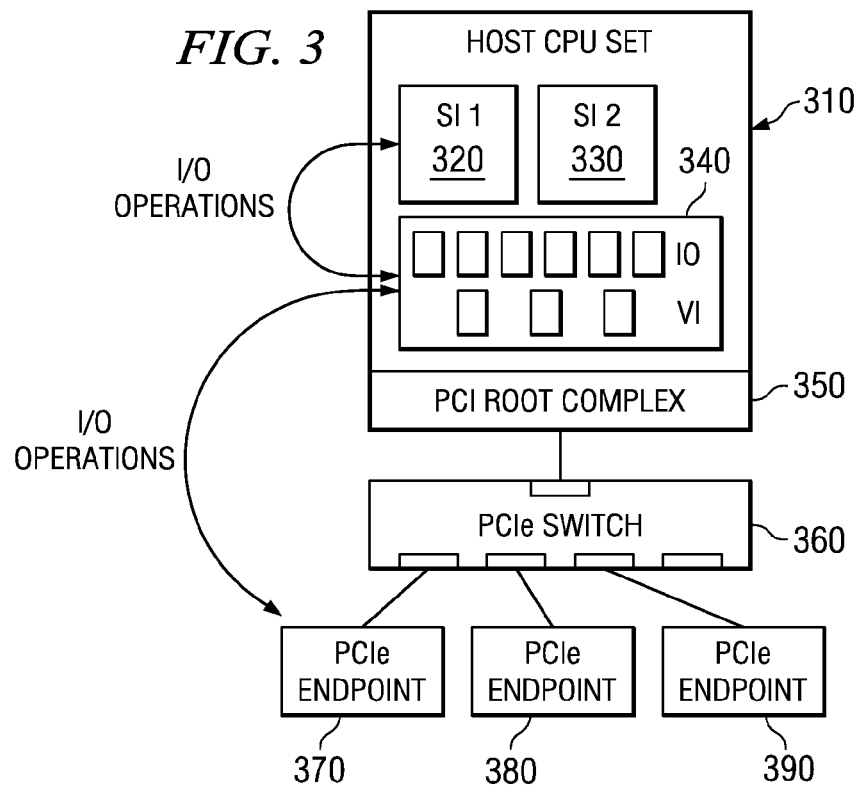
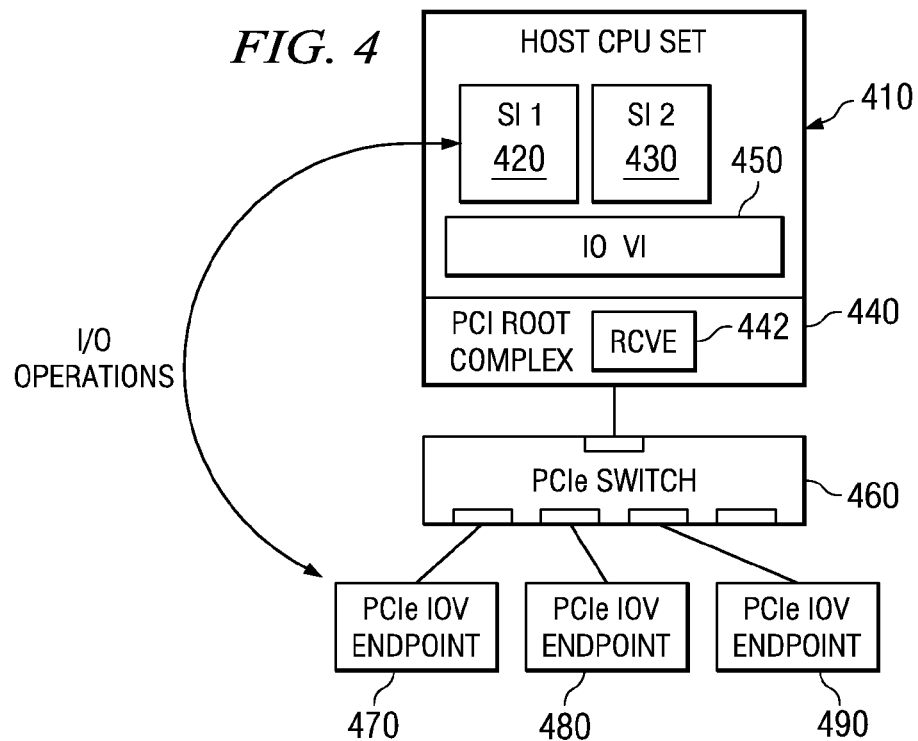

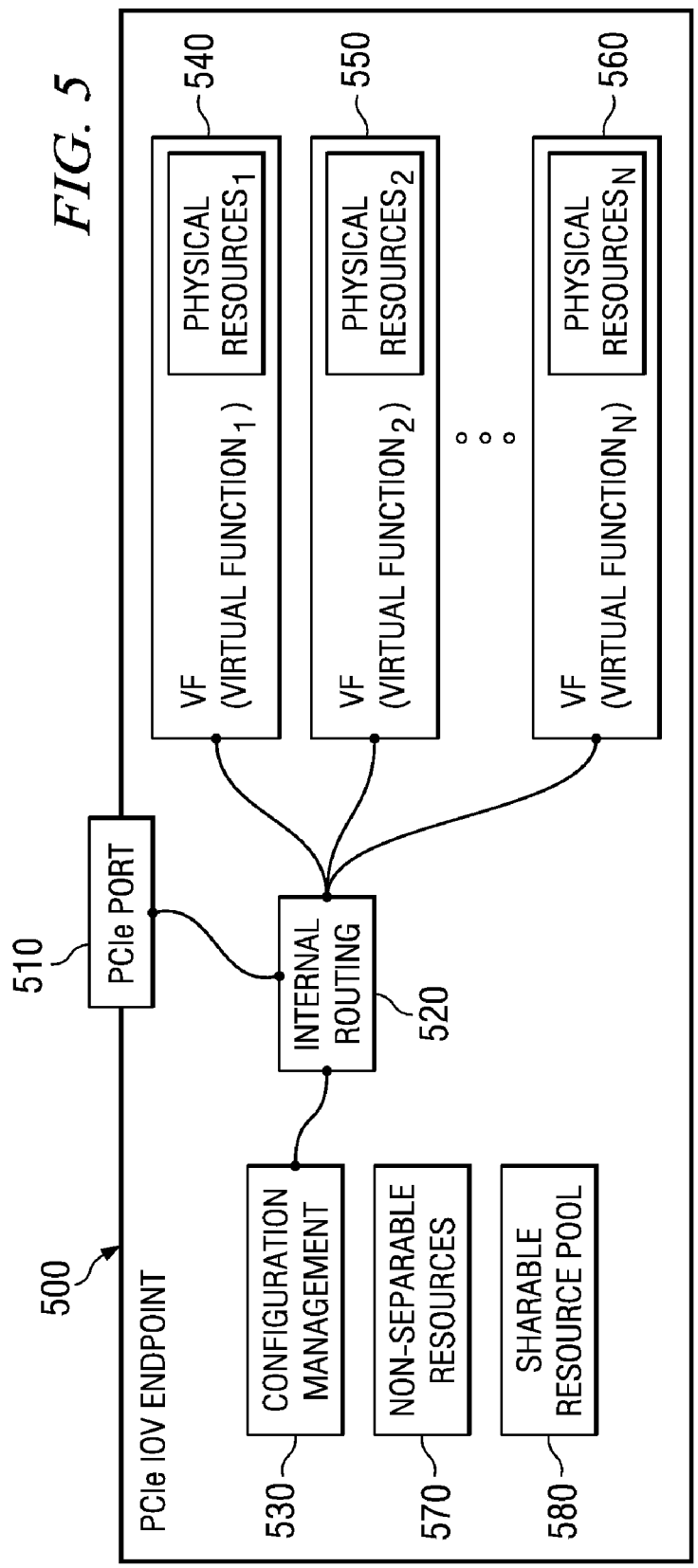

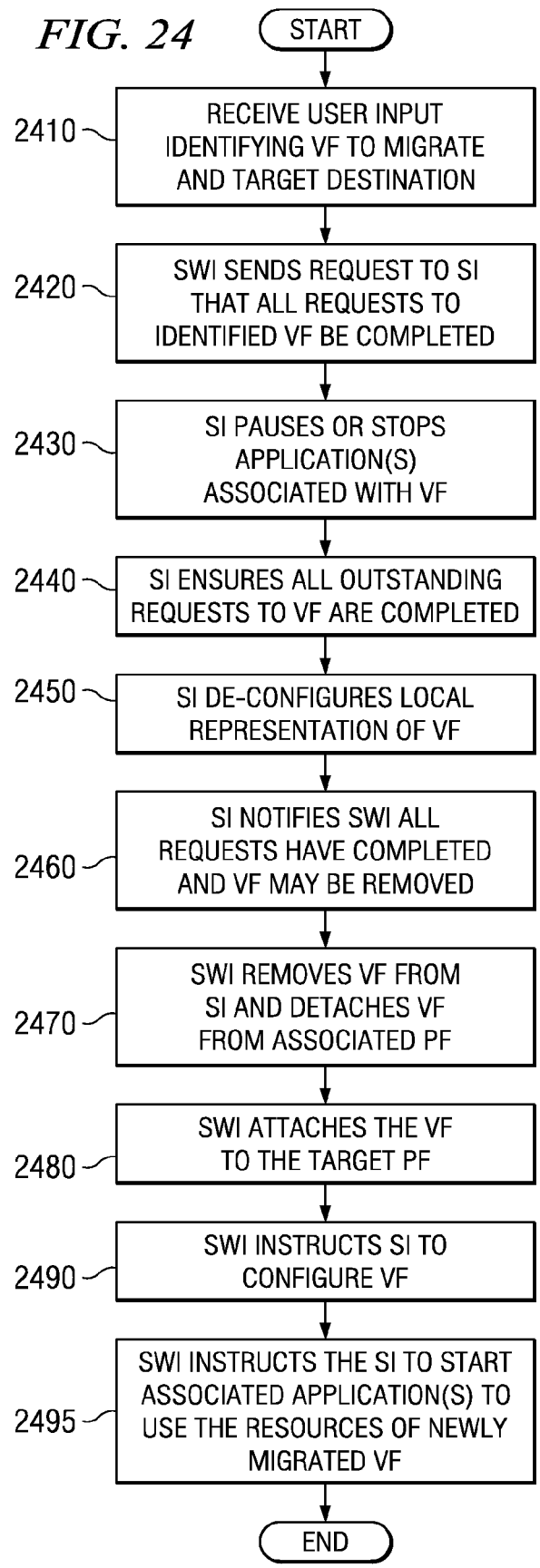

INITIALIZING SHARED MEMORIES FOR SHARING ENDPOINTS ACROSS A PLURALITY OF ROOT COMPLEXES

BACKGROUND

1. Technical Field

The present application relates generally to an improved data processing system and method. More specifically, the present application is directed to mechanisms for initializing shared memories for sharing endpoints across a plurality root complexes.

2. Description of Related Art

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

FIG. 1 is an exemplary diagram illustrating a PCI Express (PCIe) fabric topology in accordance with the PCIe specification. As shown in FIG. 1, the PCIe fabric topology 100 is comprised of a host processor (CPU) 110 and memory 120 coupled to a root complex 130, which is in turn coupled to one or more of a PCIe endpoint 140 (the term "endpoint" is used in the PCIe specification to refer to PCIe enabled I/O adapters), a PCI express to PCI bridge 150, and one or more interconnect switches 160. The root complex 130 denotes the root of an I/O hierarchy that connects the CPU/memory to the I/O adapters. The root complex 130 includes a host bridge, zero or more root complex integrated endpoints, zero or more root complex event collectors, and one or more root ports. Each root port supports a separate I/O hierarchy. The I/O hierarchies may be comprised of a root complex 130, zero or more interconnect switches 160 and/or bridges 150 (which comprise a switch or PCIe fabric), and one or more endpoints, such as endpoints 170 and 182-188. For more information regarding PCI and PCIe, reference is made to the PCI and PCIe specifications available from the peripheral component interconnect special interest group (PCI-SiG) website at www.pcisig.com.

Today, PCI and PCIe I/O adapters, buses, and the like, are integrated into almost every computing device's motherboard, including blades of a blade server. A blade server is essentially a housing for a number of individual minimally-packaged computer motherboard "blades", each including one or more processors, computer memory, computer storage, and computer network connections, but sharing the common power supply and air-cooling resources of the chassis. Blade servers are ideal for specific uses, such as web hosting and cluster computing.

As mentioned above, the PCI and PCIe I/O adapters are typically integrated into the blades themselves. As a result, the I/O adapters cannot be shared across blades in the same blade server. Moreover, the integration of the I/O adapters limits the scalability of the link rates. That is, the link rates may not scale with processor performance over time. As of yet, no mechanism has been devised to allow PCI and PCIe I/O adapters to be shared by multiple system images across multiple blades. Moreover, no mechanism has been devised to allow the PCI and PCIe I/O adapters to be provided in a non-integrated manner for use by a plurality of blades in a blade server.

SUMMARY

In one illustrative embodiment, a method is provided for initializing a shared memory for communication between a plurality root complexes of the data processing system. The method may comprise generating a first virtual hierarchy of components of a communication fabric in the data processing system, the first virtual hierarchy being associated with a first root complex of the data processing system. The method may further comprise generating a second virtual hierarchy of components of the communication fabric in the data processing system, the second virtual hierarchy being associated with a second root complex of the data processing system. A first address range in a first shared memory associated with the first root complex may be assigned for a given endpoint in the second virtual hierarchy. The first address range may be accessible by a first host system associated with the first root complex as memory mapped input/output. A second address range in a second shared memory associated with the second root complex may be assigned for the given endpoint in the second virtual hierarchy. The second address range may be accessible by a second host system associated with the second root complex through real addresses of the second host system. The method may further comprise performing communication from the first host system associated with the first root complex to the second host system associated with the second root complex by writing to the first address range in the first shared memory and performing a direct memory access operation from the first address range in the first shared memory to the second address range in the second shared memory.

Generating the first virtual hierarchy and generating the second virtual hierarchy, may comprise traversing links in the communication fabric to discover the components of the communication fabric, storing identification data for the components of the communication fabric, and generating the first and second virtual hierarchies based on the stored identification data.

Generating the first and second virtual hierarchies based on the stored identification data may comprise comparing the identification data for each endpoint component with identification data for each root complex component discovered during traversing of the links in the communication fabric. A co-residency field value associated with an endpoint component may be set if the identification data for the endpoint component matches identification data for a root complex component. The first and second virtual hierarchies may be generated based on co-residency field values associated with endpoint components of the communication fabric.

The generating and assigning operations may be performed by single root peripheral component interconnect managers (SR-PCIMs) associated with the respective first and second root complexes. The SR-PCIMs may assign, for each endpoint of a corresponding virtual hierarchy, a base address and limit within a PCI memory address space to which the endpoint belongs. The SR-PCIMs may write the base address and limit to a Base Address Register (BAR) of the endpoint. The SR-PCIMs may individually configure shared memories associated with their respective root complexes based on only the virtual hierarchy associated with their respective root complexes. The SR-PCIMs may generate the virtual hierarchies based on information gathered by a multiple root peripheral component interconnect manager (MR-PCIM) that traverses all of the links of the communication fabric and identifies associations between endpoints and root complexes present in the communication fabric.

The communication fabric may be a peripheral component interconnect express (PCIe) fabric and the endpoints are PCIe adapters. The communication fabric may be a multiple root aware communication fabric comprising one or more multiple root aware (MRA) switches. The data processing system may be a blade server and the host systems may be blades of the blade server.

At least one endpoint may have an associate address range in both the first shared memory and the second shared memory such that the at least one endpoint is shared between the first root complex and the second root complex. Performing communication between the first root complex and the second root complex utilizing the assigned address ranges in the first and second shared memories may comprise utilizing an address translation and protection table data structure to map addresses associated with one of the first or second shared memories to addresses associated with an other of the first or second shared memories.

The method may further comprise assigning an address range in the first shared memory associated with the first root complex, for each root complex in the first virtual hierarchy. The method may also comprise assigning an address range in the second shared memory associated with the second root complex, for each root complex in the second virtual hierarchy. Communication between the first host system and the second host system may be performed directly between the first root complex and the second root complex. Communication between the first host system and second host system may be performed between a root complex of one of the first host system and the second host system and an endpoint of another of the first host system and the second host system.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a data processing system is provided. The data processing system may comprise a first host system, a second host system, and a communication fabric coupling the first host system to the second host system. The first host system and second host system may perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary diagram illustrating a first approach to virtualizing I/O of a PCI root complex using a I/O virtualization intermediary;

FIG. 4 is an exemplary diagram illustrating a second approach to virtualizing I/O of a PCI root complex using natively shared PCI I/O adapters;

FIG. 5 is an exemplary diagram of a PCIe I/O virtualization enabled endpoint;

FIG. 19 is a flowchart outlining an exemplary operation for performing a pull transaction using a socket based communication connection in accordance with one illustrative embodiment;

FIG. 24 is a flowchart outlining an exemplary operation for migrating a virtual function in accordance with one illustrative embodiment;

DETAILED DESCRIPTION OF THE PREFERRED EMBODIMENTS

The illustrative embodiments provide a mechanism that allows a PCIe adaptor, or "endpoint," to be natively shared by two or more system images (SIs) of the same or different root complexes, which may be on the same or different root nodes, e.g., blades of a blade server. Further, the illustrative embodiments provide a mechanism by which communication is facilitated between the system images and natively shared endpoints. In addition, the illustrative embodiments provide mechanisms for migrating virtual functions between virtual planes, root complexes, and system images to facilitate management of the PCIe fabric. Moreover, the illustrative embodiments provide a mechanism by which a root complex's single root PCI manager (SR-PCIM) is able to read, from an endpoint, the valid combinations of functions that the endpoint implementer allowed when designing the endpoint. The SR-PCIM may then set the combinations of functions that will be used in the current configuration in which the endpoint is being used.

Figure 1:
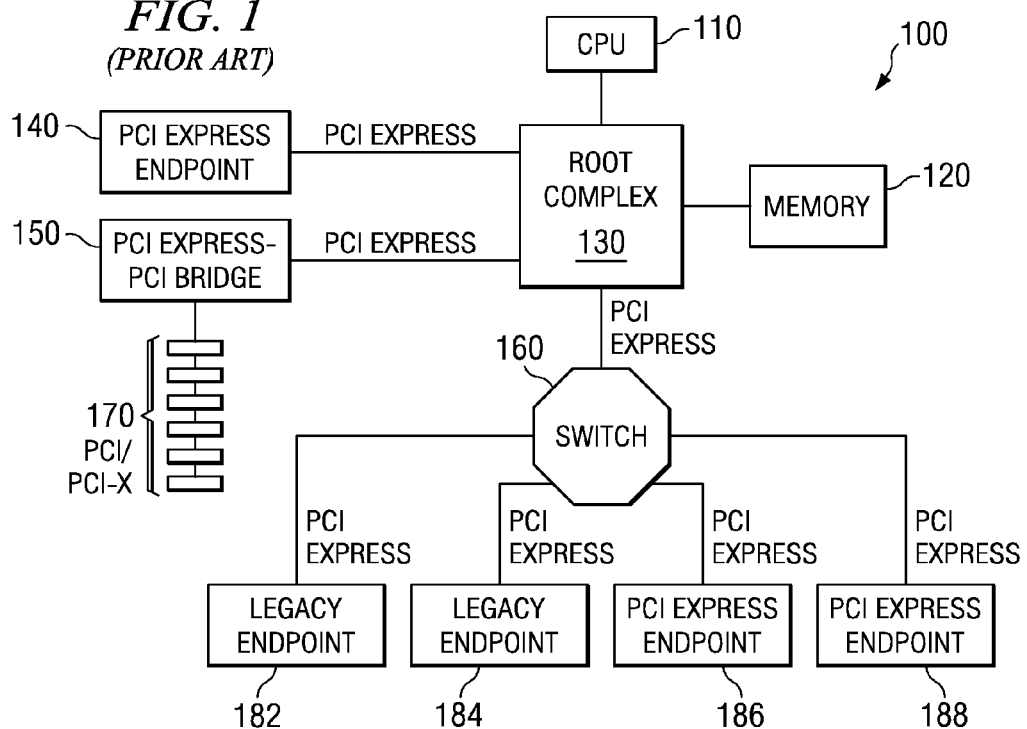
FIG. 1 is an exemplary diagram illustrating a PCIe fabric topology as is generally known in the art.
Figure 2:
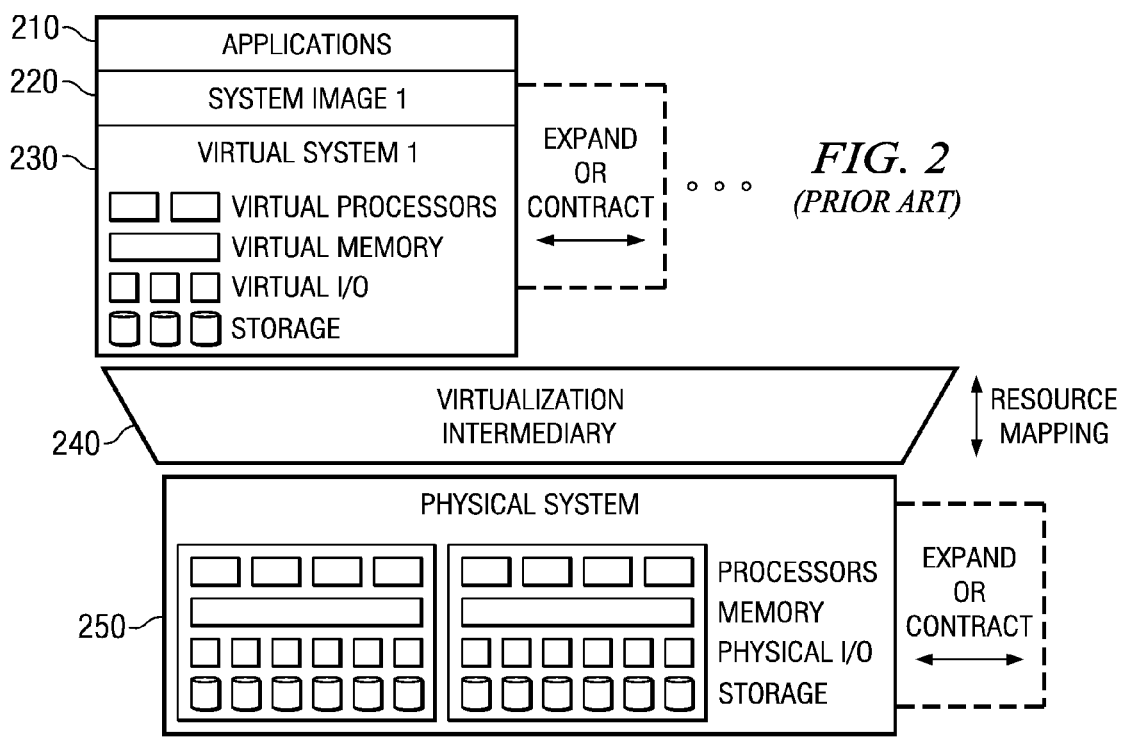
FIG. 2 is an exemplary diagram illustrating system virtualization as is generally known in the art.

FIG. 2 is an exemplary diagram illustrating system virtualization as is generally known in the art. System virtualization is the division of a physical system's processors, memory, I/O adapters, storage, and other resources where each set of resources operates independently with its own system image instance and applications. In such system virtualization, virtual resources are composed from physical resources and operate as proxies for physical resources, e.g., memory, disk drives, and other hardware components with architected interfaces/functions, having the same external interfaces and functions. System virtualization typically utilizes a virtualization intermediary which creates virtual resources and maps them to the physical resources thereby providing isolation between virtual resources. The virtualization intermediary is typically provided as one of, or a combination of, software, firmware, and hardware mechanisms.

As shown in FIG. 2, typically in a virtualized system, an application 210 communicates with a system image (SI) 220 which is a software component, such as a general or special purpose operating system, with which specific virtual and physical resources are assigned. The system image 220 is associated with a virtual system 230 which is comprised of the physical or virtualized resources necessary to run a single SI instance, e.g., virtualized processors, memory, I/O adapters, storage, etc.

The system image 220, via the use of the virtual system 230, accesses physical system resources 250 by way of the virtualization intermediary 240. The virtualization intermediary 240 manages the allocation of resources to a SI and isolates resources assigned to a SI from access by other SIs. This allocation and isolation is often performed based on a resource mapping performed by the virtualization intermediary 240 and one or more resource mapping data structures maintained by the virtualization intermediary 240.

Such virtualization may be used to allow virtualization of I/O operations and I/O resources. That is, with regard to I/O virtualization (IOV), a single physical I/O unit may be shared by more than one SI using an I/O virtualization intermediary (IOVI), such as virtualization intermediary 240. The IOVI may be software, firmware, or the like, that is used to support IOV by intervening on, for example, one or more of configuration, I/O, and memory operations from a SI, and direct memory access (DMA), completion, and interrupt operations to a SI.

FIG. 3 is an exemplary diagram illustrating a first approach to virtualizing I/O of a PCI root complex using an I/O virtualization intermediary. As shown in FIG. 3, a host processor set 310, which may be one or more processors of a chip, motherboard, blade, or the like, may support a plurality of system images 320-330 through which applications (not shown) may access system resources, such as PCIe endpoints 370-390. The system images communicate with the virtualized resources via the I/O virtualization intermediary 340, PCIe root complex 350, and one or more PCIe switches 360, and/or other PCIe fabric elements.

With the approach illustrated in FIG. 3, the I/O virtualization intermediary 340 is involved in all I/O transactions and performs all I/O virtualization functions. For example, the I/O virtualization intermediary 340 multiplexes I/O requests from the various SIs' I/O queues onto a single queue in the PCIe endpoints 370-390. Thus, the I/O virtualization intermediary acts as a proxy between the SIs 320-330 and the physical PCIe endpoints 370-390.

Such involvement by the I/O virtualization intermediary 340 may introduce additional delay in the I/O operations which limits the number of I/O operations per unit of time, and thus limits I/O performance. In addition, the involvement of the I/O intermediary requires extra CPU cycles, thus reducing the CPU performance that is available to other system operations. Extra context switches and interrupt redirection mechanisms required by this approach can also affect overall system performance. Furthermore, an IOVI 340 is not feasible when an endpoint 370-390 is shared between multiple root complexes.

FIG. 4 is an exemplary diagram illustrating a second approach to virtualizing I/O of a PCI root complex using natively shared PCI I/O adapters. As shown in FIG. 4, a host processor set 410, which may be one or more processors of a chip, motherboard, blade, or the like, may support a plurality of system images 420-430 through which applications (not shown) may access system resources, such as PCIe I/O virtualization (IOV) endpoints 470-490. The system images 420-430 communicate with the virtualized resources via the PCIe root complex 440 and one or more PCIe switches 460, and/or other PCIe fabric elements.

The PCIe root complex 440 includes root complex virtualization enablers (RCVE) 442 which may comprise one or more address translation and protection table data structures, interrupt table data structures, and the like, that facilitate the virtualization of I/O operations with IOV enabled endpoints 470-490. The address translation and protection table data structures may be used by the PCIe root complex 440 to perform address translation between virtual and real addresses for virtualized resources, control access to virtual resources based on a mapping of virtual resources to SIs, and other virtualization operations, for example. These root complex interrupt table data structures are accessible through the PCIe memory address space and are used to map interrupts to appropriate interrupt handlers associated with SIs, for example.

As with the arrangement shown in FIG. 3, an I/O virtualization interface 450 is provided in the virtualization structure of FIG. 4 as well. The I/O virtualization interface 450 is used with non-IOV enabled PCIe endpoints that may be coupled to the PCIe switch 460. That is, the I/O virtualization interface (IOVI) 450 is utilized with PCIe endpoints in a similar manner as described previously above with regard to FIG. 3 for those PCIe endpoints that do not have native, i.e. internal to the endpoint, support for I/O virtualization (IOV).

For IOV enabled PCIe endpoints 470-490, the IOVI 450 is used primarily for configuration transaction purposes and is not involved in memory address space operations, such as memory mapped input/output (MMIO) operations initiated from a SI or direct memory access (DMA) operations initiated from the PCIe endpoints 470-490. To the contrary, data transfers between the SIs 420-430 and the endpoints 470-490 are performed directly without intervention by the IOVI 450. Direct I/O operations between the SIs 420-430 and the endpoints 470-490 is made possible by way of the RCVEs 442 and the built-in I/O virtualization logic, e.g., physical and virtual functions, of the IOV enabled PCIe endpoints 470-490, as will be described in greater detail hereafter. The ability to perform direct I/O operations greatly increases the speed at which I/O operations may be performed, but requires that the PCIe endpoints 470-490 support I/O virtualization.

FIG. 5 is an exemplary diagram of a PCIe I/O virtualization (IOV) enabled endpoint. As shown in FIG. 5, the PCIe IOV endpoint 500 includes a PCIe port 510 through which communications with PCIe switches, and the like, of a PCIe fabric may be performed. Internal routing 520 provides communication pathways to a configuration management function 530 and a plurality of virtual functions (VFs) 540-560. The configuration management function 530 may be a physical function as opposed to the virtual functions 540-560. A physical "function," as the term is used in the PCI specifications, is a set of logic that is represented by a single configuration space. In other words, a physical "function" is circuit logic that is configurable based on data stored in the function's associated configuration space in a memory, such as may be provided in the non-separable resources 570, for example.

The configuration management function 530 may be used to configure the virtual functions 540-560. The virtual functions are functions, within an I/O virtualization enabled endpoint, that share one or more physical endpoint resources, e.g. a link, and which may be provided in the sharable resource pool 580 of the PCIe IOV endpoint 500, for example, with another function. The virtual functions can, without run-time intervention by an I/O virtualization intermediary, directly be a sink for I/O and memory operations from a system image, and be a source of Direct Memory Access (DMA), completion, and interrupt operations to a system image (SI).

PCIe endpoints may have many different types of configurations with regard to the "functions" supported by the PCIe endpoints. For example, endpoints may support a single physical function (PF), multiple independent PFs, or even multiple dependent PFs. In endpoints that support native I/O virtualization, each PF supported by the endpoints may be associated with one or more virtual functions (VFs), which themselves may be dependent upon VFs associated with other PFs. Exemplary relationships between physical and virtual functions will be illustrated in FIGS. 6 and 7 hereafter.

Figure 6:
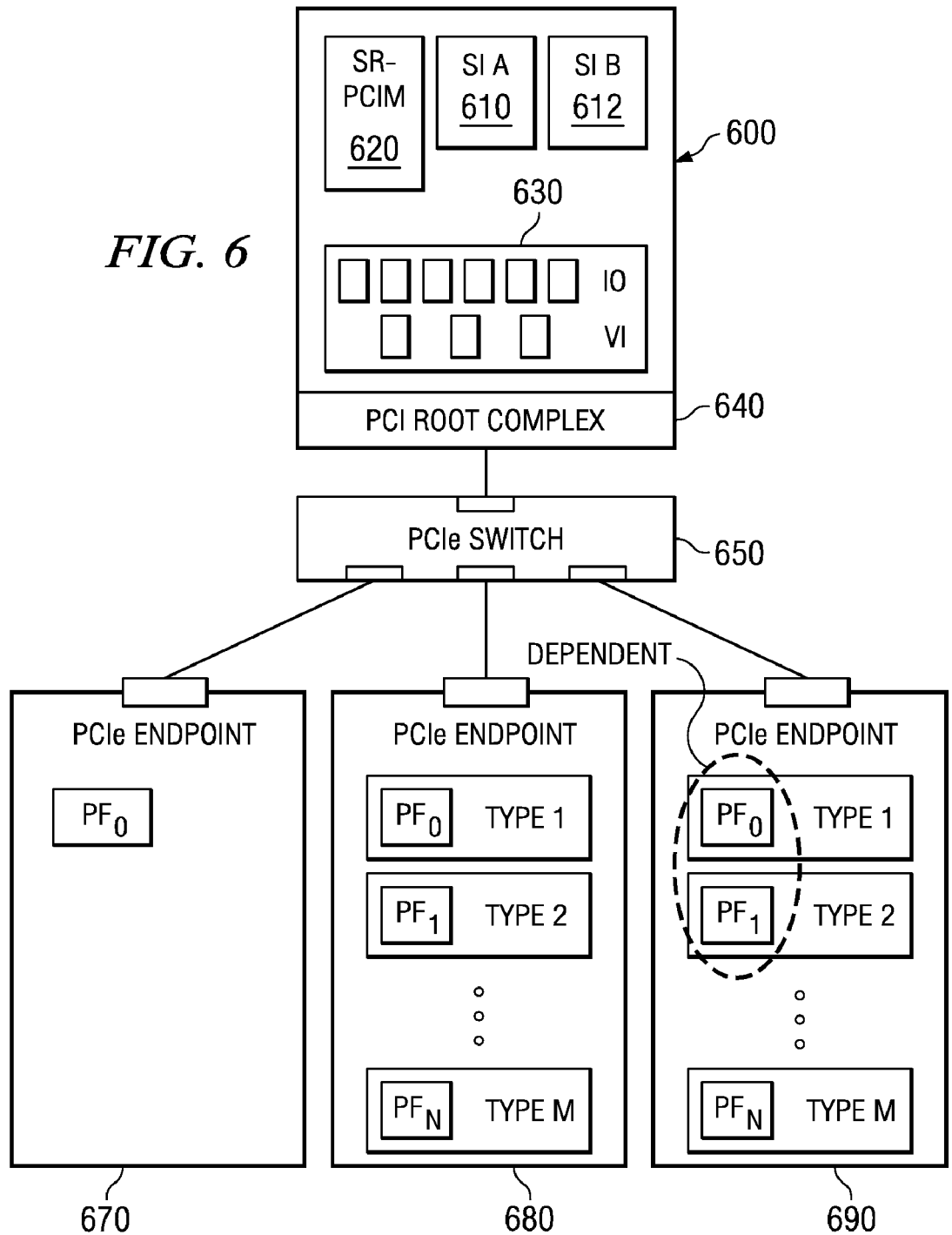
FIG. 6 is an exemplary diagram illustrating physical and virtual functions of single root endpoints without native virtualization.

FIG. 6 is an exemplary diagram illustrating physical and virtual functions of single root endpoints without native virtualization. The term "single root endpoints" refers to an endpoint that is associated with a single root complex of a single root node, i.e. a single host system. With a single root endpoint, the endpoint may be shared by a plurality of system images (SIs) associated with a single root complex, but cannot be shared among a plurality of root complexes on the same or different root nodes.

As shown in FIG. 6, the root node 600 includes a plurality of system images 610, 612, which communicate with PCIe endpoints 670-690, an I/O virtualization intermediary 630 (which is used as previously described), PCIe root complex 640, and one or more PCIe switches 650 and/or other PCIe fabric elements. The root node 600 further includes a single root PCIe configuration management (SR-PCIM) unit 620. The SR-PCIM unit 620 is responsible for managing the PCIe fabric, which includes the root complex 640, the one or more PCIe switches 650, and the like, and the endpoints 670-690. The management responsibilities of SR-PCIM 620 include determination of which functions are to be assigned to which SIs 610, 612 and the setup of the configuration space of the endpoints 670-690. The SR-PCIM 620 may configure the functions of the various endpoints 670-690 based on a SI's capabilities and input from a user, such as a system administrator, or load balancing software as to which resources are to be assigned to which SIs 610, 612. A SI's capabilities may include various factors including how much address space is available to allocate to the endpoint 670-690, how many interrupts are available to be assigned to the endpoint 670-690, and the like.

Each of the PCIe endpoints 670-690 may support one or more physical functions (PFs). The one or more PFs may be independent of each other or may be dependent upon each other in some fashion. A PF may be dependent upon another PF based on vendor defined function dependencies wherein one PF requires the operation of another PF or the result generated by another PF, for example, in order to operate properly. In the depicted example, PCIe endpoint 670 supports a single PF and PCIe endpoint 680 supports a plurality of independent PFs, i.e. $PF_0$ to $PF_N$, of different types 1 to M. A type relates to the functionality of the PF or VF, e.g., an Ethernet function and a Fiber Channel function are two different types of functions. Endpoint 690 supports multiple PFs of different types with two or more of the PFs being dependent. In the depicted example, $PF_0$ is dependent upon $PF_1$, or vice versa.

In the example shown in FIG. 6, the endpoints 670-690 are shared by the system images (SIs) 610 and 612 through the virtualization mechanisms made available by the I/O virtualization intermediary (IOVI) 630. As described previously, in such an arrangement, the IOVI 630 is involved in all PCIe transactions between the SIs 610, 612 and the PCIe endpoints 670-690. The individual PCIe endpoints 670-690 need not support virtualization in themselves since the burden of handling the virtualization is placed entirely on the IOVI 630. As a result, while known mechanisms for virtualization may be used in such an arrangement, the rate by which I/O operations may be performed is relatively slow compared to the potential for I/O rates if the IOVI 630 were not involved in every I/O operation.

Figure 7:
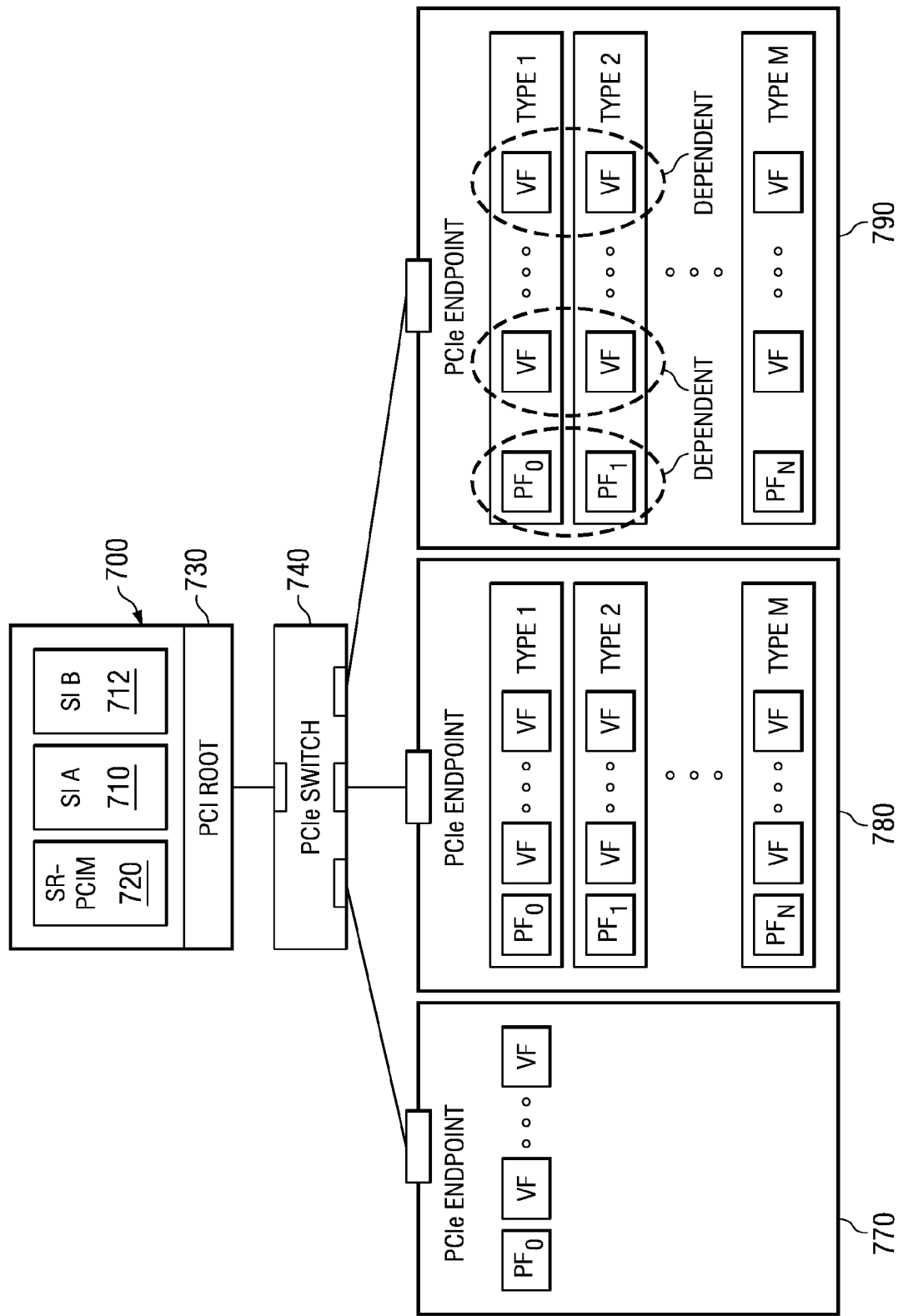
FIG. 7 is an exemplary diagram illustrating physical and virtual functions of single root endpoints enabled for native I/O virtualization.

FIG. 7 is an exemplary diagram illustrating physical and virtual functions of single root endpoints enabled for native I/O virtualization. The arrangement shown in FIG. 7 is similar to that of FIG. 6 with some important differences due to the PCIe endpoints 770-790 supporting I/O virtualization (IOV) natively, i.e. within the endpoints themselves. As a result, the I/O virtualization intermediary 630 in FIG. 6 may be effectively eliminated, except of course for configuration operations, with regard to the IOV enabled PCIe endpoints 770-790. However, if non-IOV enabled PCIe endpoints (not shown) are also utilized in the arrangement, e.g., legacy endpoints, an I/O virtualization intermediary may be used in conjunction with the elements shown in FIG. 7 to handle sharing of such non-IOV enabled PCIe endpoints between the system images 710 and 712.

As shown in FIG. 7, the IOV enabled PCIe endpoints 770-790 may support one or more independent or dependent physical functions (PFs) which in turn may be associated with one or more independent or dependent virtual functions (VFs). In this context, the PFs are used by the SR-PCIM 720 to manage a set of VFs and are also used to manage endpoint functions, such as physical errors and events. The configuration spaces associated with the PFs define the capabilities of the VFs including the maximum number of VFs associated with the PF, combinations of the PFs and VFs with other PFs and VFs, and the like.

The VFs are used by SIs to access resources, e.g., memory spaces, queues, interrupts, and the like, on the IOV enabled PCIe endpoints 770-790. Thus, a different VF is generated for each SI 710, 712 which is going to share a specific PF. VFs are generated by the endpoint 770-790 based on the setting of the number of VFs by the SR-PCIM 720 in the configuration space of the corresponding PF. In this way, the PF is virtualized so that it may be shared by a plurality of SIs 710, 712.

As shown in FIG. 7, the VFs and PFs may be dependent upon other VFs and PFs. Typically, if a PF is a dependent PF, then all of the VFs associated with that PF will also be dependent. Thus, for example, the VFs of the $PF_0$ may be dependent upon corresponding VFs of $PF_1$.

With the arrangement shown in FIG. 7, the SIs 710, 712 may communicate directly, via the PCI root complex 730 and PCIe switch 740, with the IOV enabled PCIe endpoints 770-790 and vice versa without the need for involvement by an I/O virtualization intermediary. Such direct communication is made possible by virtue of the IOV support provided in the endpoints 770-790 and in the SR-PCIM 720, which configures the PFs and VFs in the endpoints 770-790.

The direct communication between the SIs and the endpoints greatly increases the speed at which I/O operations may be performed between a plurality SIs 710, 712 and shared IOV enabled PCIe endpoints 770-790. However, in order for such performance enhancements to be made possible, the PCIe endpoints 770-790 must support I/O virtualization by providing mechanisms in the SR-PCIM 720 and the physical functions (PFs) of the endpoints 770-790 for generating and managing virtual functions (VFs).

The above illustrations of a PCIe hierarchy are limited to single root hierarchies. In other words, the PCIe endpoints are only shared by SIs 710, 712 on a single root node 700 associated with a single PCI root complex 730. The mechanisms described above do not provide support for multiple root complexes sharing the PCIe endpoints. Thus, multiple root nodes cannot be provided with shared access to the resources of a PCIe endpoint. This limits the scalability of systems utilizing such arrangements since a separate set of endpoints is required for each root node.

The illustrative embodiments herein make use of multi-root I/O virtualization in which multiple PCI root complexes may share access to the same set of IOV enabled PCIe endpoints. As a result, the system images associated with each of these PCI root complexes may each share access to the same set of IOV enabled PCIe endpoint resources but with the protections of virtualization being in place for each SI on each root node. Thus, scalability is maximized by providing a mechanism for allowing addition of root nodes and corresponding PCI root complexes which may share the same existing set of IOV enabled PCIe endpoints.

Figure 8:
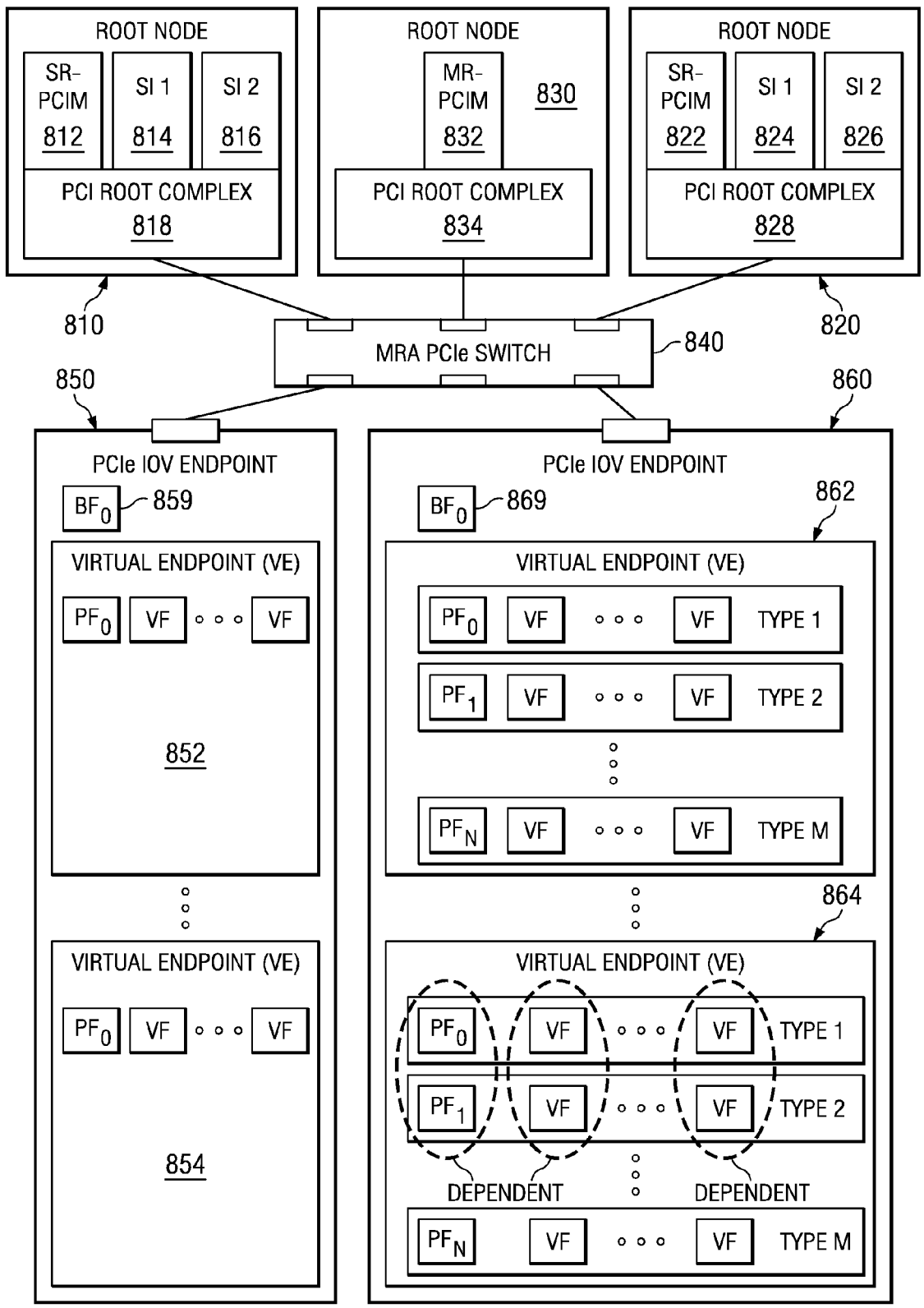
FIG. 8 is an exemplary diagram illustrating a multi-root virtualized I/O topology in accordance with one illustrative embodiment.

FIG. 8 is an exemplary diagram illustrating a multi-root virtualized I/O topology in accordance with one illustrative embodiment. As shown in FIG. 8, a plurality of root nodes 810 and 820 are provided with each root node having a single root PCI configuration manager (SR-PCIM) 812, 822, one or more system images (SIs) 814, 816, 824, and 826, and a PCI root complex 818 and 828. These root nodes 810 and 820, which may be, for example, blades in a blade server, are coupled to one or more multi-root aware (MRA) PCIe switches 840 of a PCIe switch fabric which may include one or more such MRA PCIe switches 840, and/or other PCIe fabric elements. The MRA switch 840 is of a different type than the non-MRA switch 740 in FIG. 7 in that the MRA switch 840 has connections for additional root nodes and contains the mechanisms required for keeping the address spaces of those different root nodes separate and distinct.

In addition to these root nodes 810 and 820, a third root node 830 is provided that includes a multi-root PCI configuration manager (MR-PCIM) 832 and corresponding PCI root complex 834. The MR-PCIM 832 is responsible for discovering and configuring virtual hierarchies within the multi-root (MR) topology shown in FIG. 8, as will be discussed in greater detail hereafter. Thus, the MR-PCIM 832 configures the physical and virtual functions of the endpoints with regard to multiple root complexes of multiple root nodes. The SR-PCIMs 812 and 822 configure the physical and virtual functions of their associated single root complex. In other words, the MR-PCIM sees the MR topology as a whole, while the SR-PCIM sees only its own virtual hierarchy within the MR topology, as described in greater detail hereafter.

As shown in FIG. 8, the IOV enabled PCIe endpoints 850 and 860 support one or more virtual endpoints (VEs) 852, 854, 862, and 864. A VE is a set of physical and virtual functions assigned to a root complex. Thus, for example, a separate VE 852 and 862 are provided on the IOV enabled PCIe endpoints 850 and 860 for the PCI root complex 818 of root node 810. Similarly, a separate VE 854 and 864 are provided on the IOV enabled PCIe endpoints 850 and 860 for the PCI root complex 828 of root node 820.

Each VE is assigned to a virtual hierarchy (VH) having a single root complex as the root of the VH and the VE as a terminating node in the hierarchy. A VH is a fully functional PCIe hierarchy that is assigned to a root complex or SR-PCIM. It should be noted that all physical functions (PFs) and virtual functions (VFs) in a VE are assigned to the same VH.

Each IOV enabled PCIe endpoint 850 and 860 supports a base function (BF) 859 and 869. The BF 859, 869 is a physical function used by the MR-PCIM 832 to manage the VEs of the corresponding endpoint 850, 860. For example, the BF 859, 869 is responsible for assigning functions to the VEs of the corresponding endpoints 850, 860. The MR-PCIM 832 assigns functions to the VEs by using the fields in the BF's configuration space that allows assignment of a VH number to each of the PFs in the endpoint 850, 860. In the illustrative embodiments, there can be only one BF per endpoint, although the present invention is not limited to such.

As shown in FIG. 8, each VE 852, 854, 862, and 864 may support their own set of physical and virtual functions. As described previously, such sets of functions may include independent physical functions, dependent physical functions, and their associated independent/dependent virtual functions. As shown in FIG. 8, VE 852 supports a single physical function ($PF_0$) with its associated virtual functions (VFs). VE 854 likewise supports a single physical function ($PF_0$) with its associated virtual functions (VFs). VE 862 supports a plurality of independent physical functions ($PF_0$-$PF_N$) and their associated virtual functions (VFs) VE 864, however, supports a plurality of dependent physical functions ($PF_0$-$PF_N$).

A VE 852, 854, 862, or 864 may directly communicate with the SIs 814, 816, 824, and 826 of the root nodes 810 and 820, if and only if the VE is assigned to a VH to which the SI has access, and vice versa. The endpoints 850 and 860 themselves must support single root I/O virtualization, such as described previously above, and multi-root I/O virtualization as described with regard to the present illustrative embodiments. This requirement is based on the fact that the topology supports multiple root complexes but each individual root node sees only its associated single root based virtual hierarchy.

Figure 9:
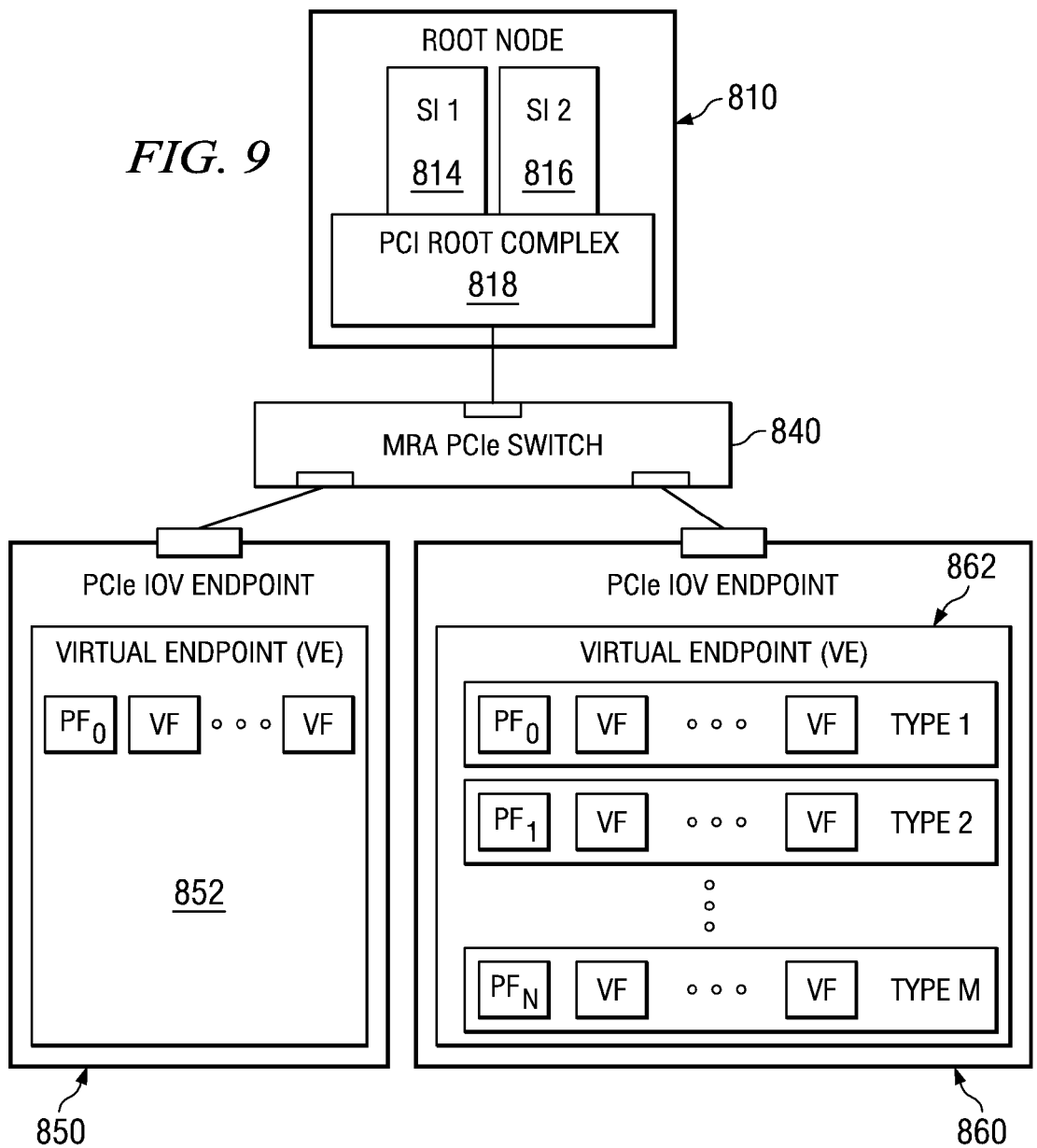
FIG. 9 is an exemplary diagram illustrating a virtual hierarchy view of a multi-root virtualized I/O topology from the viewpoint of a SR-PCIM of a root node in accordance with one illustrative embodiment.

FIG. 9 is an exemplary diagram illustrating a virtual hierarchy view of a multi-root virtualized I/O topology from the viewpoint of a root complex of a root node in accordance with one illustrative embodiment. As shown in FIG. 9, while the multi-root (MR) topology may be as shown in FIG. 8, each root complex of each individual root node views only its portion of the MR topology. Thus, for example, the PCI root complex 818 associated with root node 810 sees its host processor set, its own system images (SIs) 814, 816, the MRA switch 840, and its own virtual endpoints (VEs) 852 and 862. There is full PCIe functionality within this virtual hierarchy, however, the PCI root complex 818 does not see the VEs, root complexes, system images, etc, that are not part of its own virtual hierarchy.

Because of this arrangement, limitations are imposed on the communication between root complexes of root nodes in a MR topology. That is, since PCIe functionality is limited to the virtual hierarchy associated with the root complex, root complexes cannot communicate with one another. Moreover, the system images associated with the various root complexes cannot communicate with system images of other root complexes. In order to address such limitations, the illustrative embodiments herein provide various mechanisms to provide support for communications between virtual hierarchies and specifically, root complexes of different root nodes.

In order for a host system of the illustrative embodiments to communicate with multiple endpoints via its root complex, the host system uses a shared memory that is shared by the various endpoints and root complexes with which the host system is associated. In order to ensure proper operation of the endpoints with the host system, this shared memory must be initialized such that each endpoint that is associated with the host system is provided with its own portion of the shared memory through which various communications may be performed. The illustrative embodiments utilize a mechanism for initializing the shared memory of a host system in which the PCIe fabric is discovered and endpoints of the PCIe fabric are virtually tied to root complexes of the host systems. Each endpoint and root complex is then given its own portion of a shared memory address space of each host system to which it is virtually tied. Through these portions of the host systems' shared memories, an endpoint associated with a root complex of one host system may communicate with one or more other root complexes of other host systems.

Figure 10:
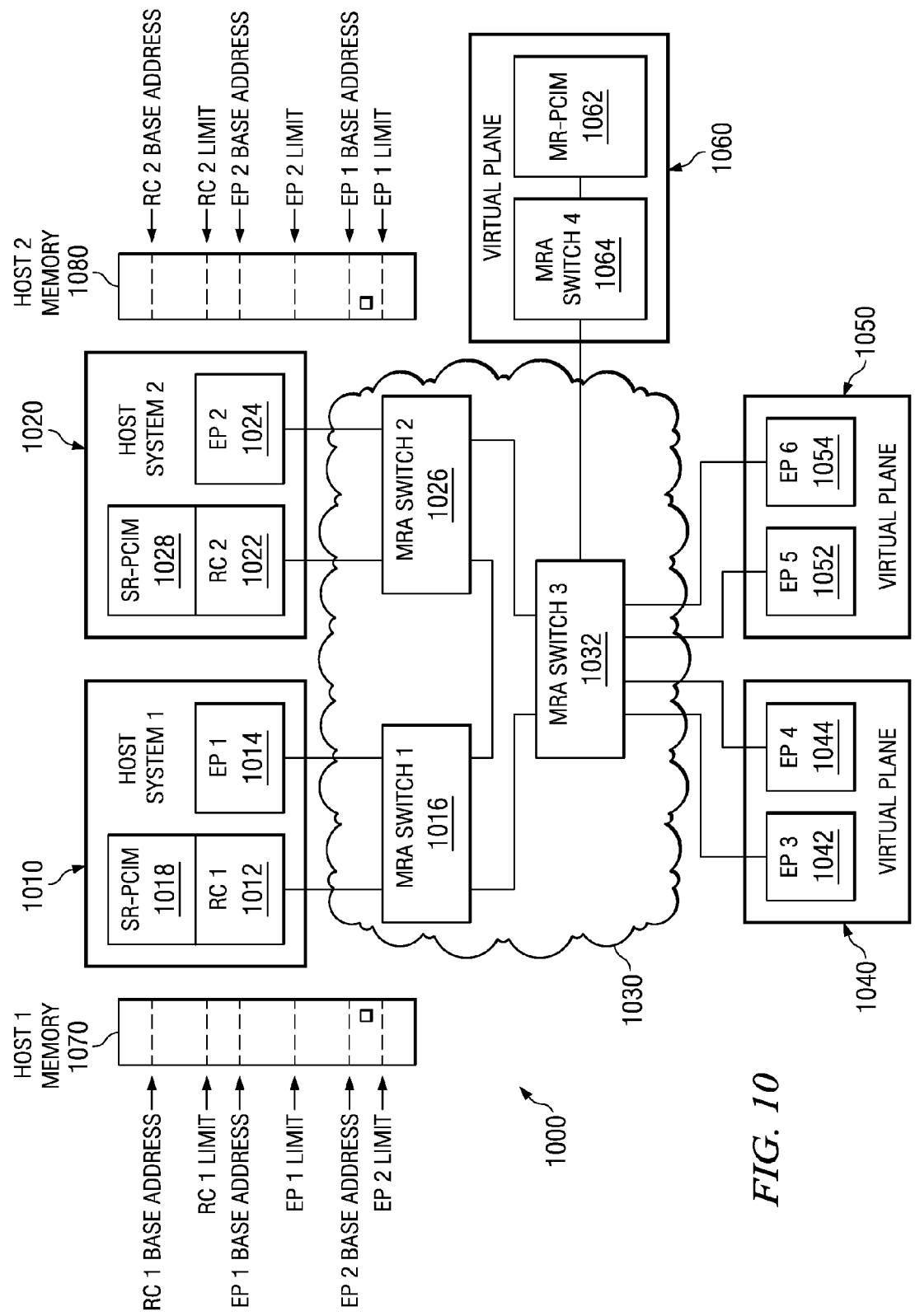
FIG. 10 is an exemplary diagram illustrating a shared memory PCIe based system in accordance with one illustrative embodiment.

FIG. 10 is an exemplary diagram illustrating a shared memory PCIe based system in accordance with one illustrative embodiment. As shown in FIG. 10, a system 1000 has a host system 1010 that comprises a first root complex (RC1) 1012 and a first endpoint (EP1) 1014, and is associated with a first multiple-root aware (MRA) switch 1016, which may also be provided as part of the host system 1010. The system 1000 has a second host system 1020 that comprises a second root complex (RC2) 1022 and a second endpoint (EP2) 1024, and is associated with a second multiple-root aware (MRA) switch 1026, which may also be provided as part of the host system 1020. Each of these host systems 1010 and 1020 may represent, for example, separate blades in a same multi-root blade cluster system 1000. Alternatively, the host systems 1010 and 1020 may be provided on separate computing devices entirely. Each host system 1010 and 1020 is in its own virtual hierarchy (VH). The host systems 1010 and 1020 are connected to one another and with other shared endpoints EP3-EP6 1042-1044 and 1052-1054, via communication links with one or more MRA switches 1016, 1026, and 1032 of a PCIe fabric 1030. The communication links associated with the host systems 1010 and 1020 and endpoints 1042-1044 and 1052-1054 may be associated with one or more virtual planes (VPs).

There are no virtual hierarchy (VH) identifiers used in a PCIe fabric to distinguish which host system 1010 and 1020 is associated with a given PCIe transaction. Instead a link local virtual plane (VP) identifier is used. Since the VP identifier is link local, RC 1's VH may have, for example, VP=4 on a link between 1032 and 1016 and VP=4 on a link between 1032 and 1042. In other words, a VH is made up of a set of PCIe components and the links that attach those components, with each of those links having a link local VP identifier used to designate which VH a given transaction is referencing.

In the depicted example, the goal is to permit the root complex 1012, and thus, the applications running in association with one or more system images associated with the root complex 1012, to communicate with an endpoint associated with another root complex, e.g., endpoint EP2 1024 associated with root complex RC2 1022. Thus, for example, EP2 1024 may be used as an endpoint by system images running on root complex RC1 1012. In this way, endpoints that are co-resident with root complexes may be shared across system images on various virtual planes and/or host systems. As a result, high performance node-to-node, i.e. host system to host system, communications and load balancing may be facilitated as well as system cost reduction by eliminating the need to go through an external networking adapter and switch, such as an InfiniBand or Ethernet switch, when communicating between the nodes.

In order to permit endpoints to be shared by system images across host systems, a multi-root PCI configuration manager (MR-PCIM) 1062, provided in one of the host systems 1010 or 1020, or a separate host system 1060, initializes the host systems' memory spaces 1070 and 1080 to establish base and limit apertures for the root complexes and endpoints. The MR-PCIM 1062 accesses the PCIe fabric 1030 via the MRA switch 1064 and one or more MRA switches 1032 in the PCIe fabric 1030.

The MR-PCIM 1062 traverses the links of the PCIe fabric 1030 through the various interconnected switches, in a manner generally known in the art, to identify the root complexes and endpoints associated with the PCIe fabric 1030. With the traversal performed by the illustrative embodiments, however, all of the root complexes (RCs), with the exception of the root complex (RC) performing the discovery fabric traversal operation, are treated as endpoints during the discovery fabric traversal.

As the MR-PCIM 1062 traverses the PCIe fabric, it performs a number of checks between the root complexes and the endpoints to determine if a given root complex is associated with a given endpoint. From the resulting information, the MR-PCIM 1062 generates one or more virtual PCI tree data structures that tie the endpoints available on the PCIe fabric 1030 to each of the root complexes. Endpoints that are associated with the same root complex, are associated with each other in the virtual PCI tree data structures.

After the MR-PCIM 1062 discovers and configures the fabric, the respective RCs allow their associated SR-PCIMs 1018 and 1028 to discover and configure the VHs. Each SR-PCIM 1018, 1028 assigns, for each given endpoint, a base address and limit within the PCIe memory address space(s) to which it belongs, e.g., the PCIe memory address space(s) associated with host system 1 memory 1070 and host system 2 memory 1080. The SR-PCIM 1018, 1028 writes this base address and limit to the Base Address Register (BAR) of the EP. Work requests and completion messages may then be written to these portions of the PCI memory address space(s) in order to facilitate communication between the various root complexes and the endpoints across host systems 1010 and 1020, as will be described in greater detail hereafter.

As mentioned above, with the illustrative embodiments, the MR-PCIM 1062 performs a number of checks between the root complexes and the endpoints as it traverses the PCIe fabric 1030. For example, the MR-PCIM 1062 accesses the PCIe configuration space of each function, physical function and virtual function of an EP, the PCIe configuration spaces being located in the EPs, as defined by the PCI specifications. The MR-PCIM also accesses the Vital Product Data (VPD) fields for each endpoint and stores the VPD information for later comparison, such as in a non-volatile storage area (not shown) coupled to the MR-PCIM 1062, for example.

VPD is the information that uniquely defines items such as hardware, software, and microcode elements of a system. The VPD provides the system with information on various field replaceable units (FRUs) including vendor name, part number, serial number, and other detailed information that is useful for administration, asset management, and anything that requires unique identification of the PCI device. The VPD information typically resides in a storage device, e.g., a serial EEPROM, in a PCI device, such as an endpoint 1014, 1024. More information regarding VPD may be obtained from the PCI Local Bus Specification, Revision 3.0 available at www-.pcisig.com.

The MR-PCIM 1062, after having retrieved and stored the VPD information for each of the endpoints 1014, 1024, 1042, 1044, 1052, and 1054, identifies which EP's and RC's reside on the same hardware device, e.g. blade. For example, the MR-PCIM 1062 accesses the VPD information of a MRA switch 1016, 1026, 1032 which contains a co-residency field that indicates that it is associated with a hardware device which holds an RC and an EP. The MRA switch 1016, 1026, 1032 stores the VH assigned to the RC which may then be used to determine which EPs and RCs reside on the same hardware device.

Figure 11A:
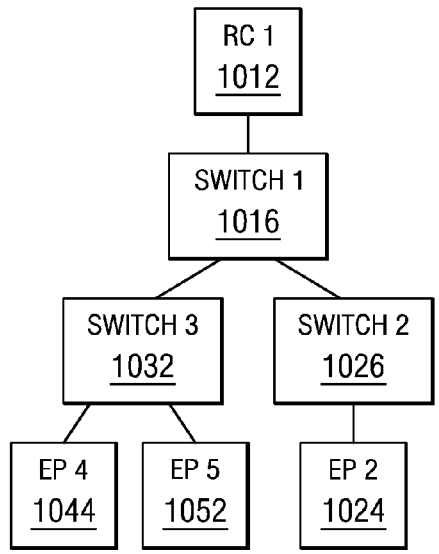
FIGS. 11A and 11B are diagrams representing exemplary virtual PCI tree data structures in accordance with one illustrative embodiment.
Figure 11B:
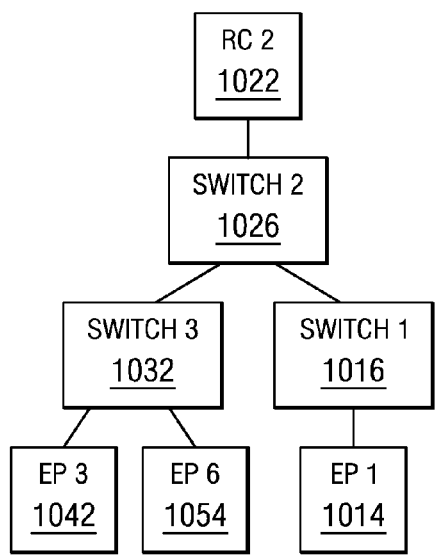

After determining that an EP co-exists with a RC on the same host, the MR-PCIM 1062 creates one or more virtual PCI tree data structures, such as illustrated in FIGS. 11A and 11B. As shown in FIGS. 11A and 11B, the virtual PCI tree data structure ties the endpoints available on the PCIe fabric to each root complex.

It is assumed in the virtual PCI tree data structure shown in FIG. 11A that the endpoints EP2 1024, EP4 1044, and EP5 1052 are associated with root complex RC1 1012 via assignments indicated to the MR-PCIM 1062 by the user. The VPD matching described above is only performed to allow a RC to determine that an EP is physically residing on the RC's host. This tells the RC that the EP is accessible to the RC through standard PCI memory mapped addressing in the RC's address space. This is a physical association. With the virtual PCI tree data structures, logical associations are specified by way of a user indicating that he/she wants the MR-PCIM 1062 to create such logical associations.

Similarly, it is assumed in FIG. 11B that the endpoints EP1 1014, EP3 1042, and EP6 1054 are associated with root complex RC1 1012 via user input specifying logical associations, and their VPD information and the comparisons made by the MR-PCIM 1062. Thus, in the depicted example shown in FIG. 11A, endpoint EP2 1024 is associated with, or tied with, root complex RC1 1012 via switch 2 1026 and switch 1 1016. Endpoints EP4 1044 and EP5 1052 are associated with root complex RC1 1012 via switch 3 1032 and switch 1 1016. In FIG. 11B, endpoint EP1 1014 is associated with, or tied with, root complex RC2 1022 via switch 1 1016 and switch 2 1026. Endpoints EP3 1042 and EP6 1054 are associated with root complex RC2 1022 via switch 3 1032.

Based on these virtual PCI tree data structures, the MR-PCIM 1062 assigns each endpoint a base address and limit within the PCIe memory address space(s) it belongs to. The base addresses may be stored in the endpoints' Base Address Registers (BARs). For example, EP1 1014 is accessible through two PCIe memory address spaces 1070 and 1080. In host system 1 1010, EP1 1014 is accessible by the host system's processor (not shown) through the host system's memory 1070 address space. In host system 2 1020, EP1 1014 has a PCIe aperture, defined by the EP1 base address and limit, in host system 2's memory 1080 address space that is accessible via memory mapped I/O through PCI bus memory addresses. The processor of host system 1 1010 may use a memory address translation and protection table (not shown), such as may be provided in a virtualization intermediary, such as a hypervisor, the root complex 1012, or the like, to map the PCIe memory addresses seen by the processor of host system 2 1020 into host system 1 memory addresses, for example.

Similarly, the endpoint EP2 1024 is accessible through two PCIe memory address spaces for host system memories 1070 and 1080. In host system 2 1020, EP2 1024 is accessible by host system 2's processor through host system 2's real memory addresses for its memory 1080. In host system 1 1010, EP2 1024 has a PCIe aperture, defined by the base address and limit for EP2 1024, in host system 1's memory 1070 that is accessible as memory mapped I/O through PCI bus memory addresses. Host system 2 1020 may use a memory address translation and protection table (not shown) to map the PCIe memory addresses seen by host system 1 1010 into host system 2 real memory addresses.

Similar portions of host system memories 1070 and 1080 may be initialized for the root complexes RC1 1012 and RC2 1022. For example, in host system 1 1010, RC1 1012 is accessible by host system 1's processor through host system 1's real memory addresses for host system 1's memory 1070. RC1 1012 has a PCIe aperture in host system 2's memory space that is accessible via direct memory access (DMA) I/O through host system 1's PCI bus memory addresses. Host system 1 1010 may use a memory address translation and protection table (not shown) to map the PCIe memory addresses seen by host system 2 1020 into host system 1 real memory addresses.

Similarly, in host system 2 1020, RC2 1022 is accessible by host system 2's processor through host system 2 real memory addresses for memory 1080. RC2 1022 has a PCIe aperture in host system 1's memory 1070 that is accessible as DMA I/O through host system 2's PCI bus memory addresses. Host system 2 1020 can use a memory address translation and protection table (not shown) to map the PCIe memory addresses seen by host system 1 1010 into host system 2 real memory addresses.

Thus, the mechanism of the illustrative embodiments provide for the initialization of memory spaces in the host systems such that an endpoint may be accessible by more than one root complex in a plurality of host systems. The portions of the memory spaces assigned to the various endpoints may then be utilized by the root complexes to send requests and completion messages to and from the endpoints.

Figure 12:
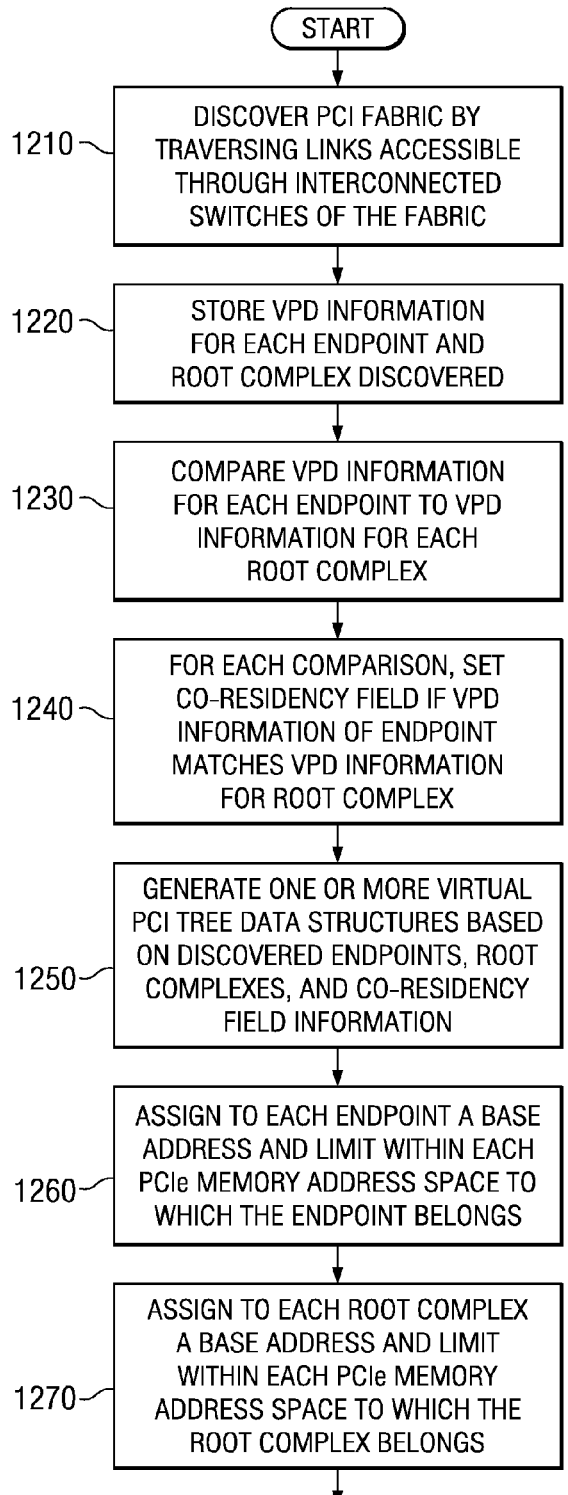
FIG. 12 is a flowchart outlining an exemplary operation for initializing memory address spaces of host systems for sharing of endpoints in accordance with one illustrative embodiment.

FIG. 12 is a flowchart outlining an exemplary operation for initializing memory address spaces of host systems for sharing of endpoints in accordance with one illustrative embodiment. It will be understood that each block of the flowchart illustration in FIG. 12, and flowchart illustrations described hereafter, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 12, the operation starts with a MR-PCIM discovering the PCIe fabric by traversing all the links accessible through interconnected switches of the PCIe fabric (step 1210). VPD information for each of the endpoints and root complexes discovered during the discovery of the PCIe fabric is stored (step 1220).

The MR-PCIM compares VPD information for each endpoint to the VPD information for each root complex to determine if a given endpoint is associated with a given root complex (step 1230). For each comparison, the MR-PCIM sets a corresponding co-residency field if the VPD information matches for the endpoint and the root complex (step 1240). Based on the discovered endpoints and root complex information and the settings of the co-residency fields for each of the comparisons, the MR-PCIM generates one or more virtual PCI tree data structures (step 1250).

Based on the generated virtual PCI tree data structure(s), the MR-PCIM assigns to each endpoint a base address and limit within each PCIe memory address space to which the endpoint belongs (step 1260). Based on the generated virtual PCI tree data structure(s), the MR-PCIM assigns to each root complex a base address and limit within each PCIe memory address space to which that root complex belongs (step 1270). The operation then terminates.

Having initialized the memory address spaces of the host systems such that endpoints may be accessible by root complexes across host systems, these memory address spaces may then be used to allow system images, and their corresponding applications, associated with these root complexes to communicate with the endpoints. One way in which such communication is facilitated is via a queuing system that utilizes these initialized memory address spaces in the various host systems. Such a queuing system may comprise a work queue structure and a completion queue structure. Both the work queue structure and the completion queue structure may comprise a doorbell structure for identifying a number of queue elements (either work queue elements (WQEs) or completion queue elements (CQE) depending upon whether the queue structure is a work queue structure or a completion queue structure), a base address for the start of a queue, a limit address for an end of the queue, and an offset which indicates the next WQE or CQE to be processed in the queue. Both the work queue structure and the completion queue structure may be used to both send and receive data.

Figure 13:
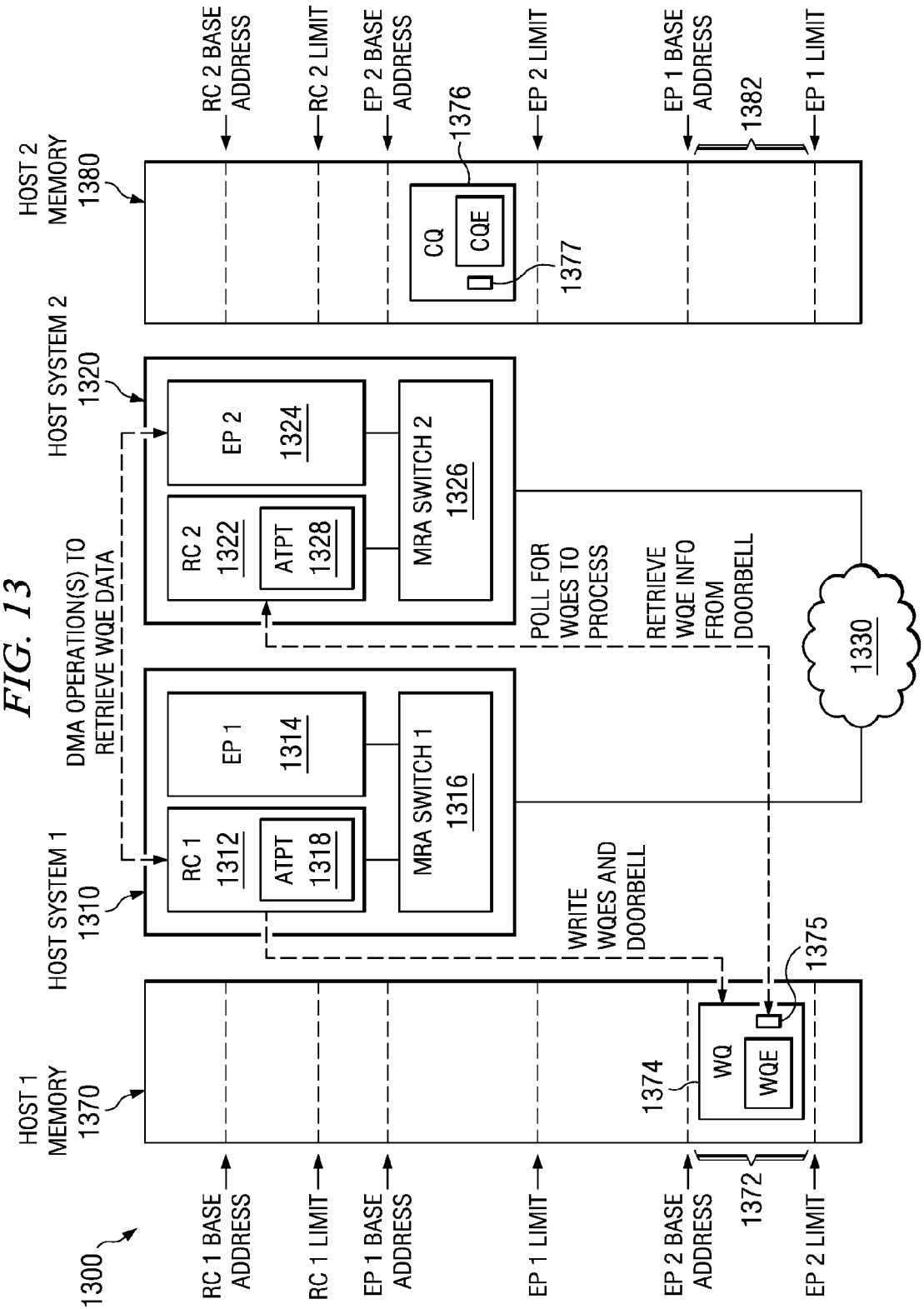
FIG. 13 is an exemplary block diagram illustrating a process for sending a work queue element (WQE) from a first host system to a second host system in accordance with one illustrative embodiment.

FIG. 13 is an exemplary block diagram illustrating a process for sending a work queue element (WQE) from a first host system to a second host system in accordance with one illustrative embodiment. It is assumed, for purposes of this description, that a system is established having host systems, e.g., a first host system 1310 and a second host system 1320, with multiple shared PCI root complexes, e.g., RC1 1312 and RC2 1322, connected by a PCIe fabric 1330, which may include MRA switches 1316 and 1326 as well. It is further assumed that an endpoint, e.g., EP2 1324, residing in the second host system 1320 with root complex RC2 1322, is to be shared with a root complex RC1 1312 of a first host system 1310 across the PCIe fabric 1330 and is appropriately mapped onto the internal memory 1380 address space of the second host system 1320 and the first host system's PCI bus memory address space. This system configuration may be achieved, for example, by using the initialization mechanisms described previously with regard to FIGS. 10-12, for example.

As shown in FIG. 13, the endpoint EP1 1314 is accessible through memory spaces associated with the two host system memories 1370 and 1380. On a first host system 1310, the endpoint EP1 1314 is accessible by the first host system's processor through the first host system's real memory addresses for the first host system's memory 1370. On the second host system 1320, the endpoint EP1 1314 has a PCIe aperture 1382 on the second host system's memory 1380 that is accessible as memory mapped I/O through PCI bus memory addresses. The first host system 1310 can use a memory address translation and protection table (ATPT) 1318 to map the PCIe memory addresses seen by the second host system 1320 into real memory addresses for the first host system's memory space 1370.

Similarly, the endpoint EP2 1324 is accessible through the two host system memory spaces 1370 and 1380. On the second host system 1320, the endpoint EP2 1324 is accessible by the second host system's processor through the second host system's real memory addresses and memory address space 1380. On the first host system 1310, the endpoint EP2 1324 has a PCIe aperture 1372 on the first host system's memory 1370 that is accessible as memory mapped I/O through PCI bus memory addresses. The second host system 1320 may use a memory address translation and protection table (ATPT) 1328 to map the PCIe memory addresses sent by the first host system 1310 to real memory addresses of the second host system's memory space 1380.

A work queue structure 1374 may comprise a doorbell structure 1375 used to pass a number of WQEs, a base address for the start of the queue, a limit address for the end of the queue, and an offset which indicates the next WQE to be processed in the work queue. Similarly, a completion queue structure 1376 may comprise a doorbell structure 1377 used to pass the number of CQEs, a base address for the start of the queue, a limit address for the end of the queue, and an offset which indicates the next CQE to be processed in the completion queue.

In order to send a WQE from the first host system 1310 to the second host system 1320, the first host system 1310 initiates the process by inserting one or more WQEs into its send work queue 1374. Each WQE contains a list of data segments, where each data segment comprises a base address and a limit address that are both in the second host system's PCIe memory bus address space and are also mapped, via an address translation and protection table (ATPT), to real memory addresses in the first host system's memory space 1370.

The first host system 1310 then writes the number of WQEs that are being sent into endpoint EP2's PCIe address for the doorbell structure 1375. The address for this doorbell structure is mapped, via an ATPT, into the first host system's PCIe memory bus address space and is also mapped to real memory addresses in the second host system's memory space 1380. When the doorbell write operation completes, the RC of the second host system 1320 either polls, or gets an interrupt and then polls, to retrieve the doorbell structure 1375 through the first host system's real memory address space 1380. That is, the RC of the second host system 1320 may be configured to periodically poll the address for the doorbell structure 1375 to determine if new WQEs are to be processed. Alternatively, the setting of the doorbell structure 1375 by the first host system 1310 may generate an interrupt to the second host system 1320 to inform the RC of the second host system 1320 of the new WQEs available for processing. The RC of the second host system 1320 may then poll the doorbell structure 1375 for the new WQEs' information and process them accordingly.

The endpoint EP2 1324 then performs PCIe DMA operations to root complex RC1 1312 to retrieve the WQEs. Each DMA operation uses the first host system's PCIe memory bus address space and places the results of the DMA operation into the second host system's memory 1380 that is accessible on the second host system 1320 through its real memory address space. Thus, using the initialized shared memories of the host systems 1310 and 1320, communication of work queue elements between root complexes and endpoints in different host systems 1310 and 1320 is facilitated.

Figure 14:
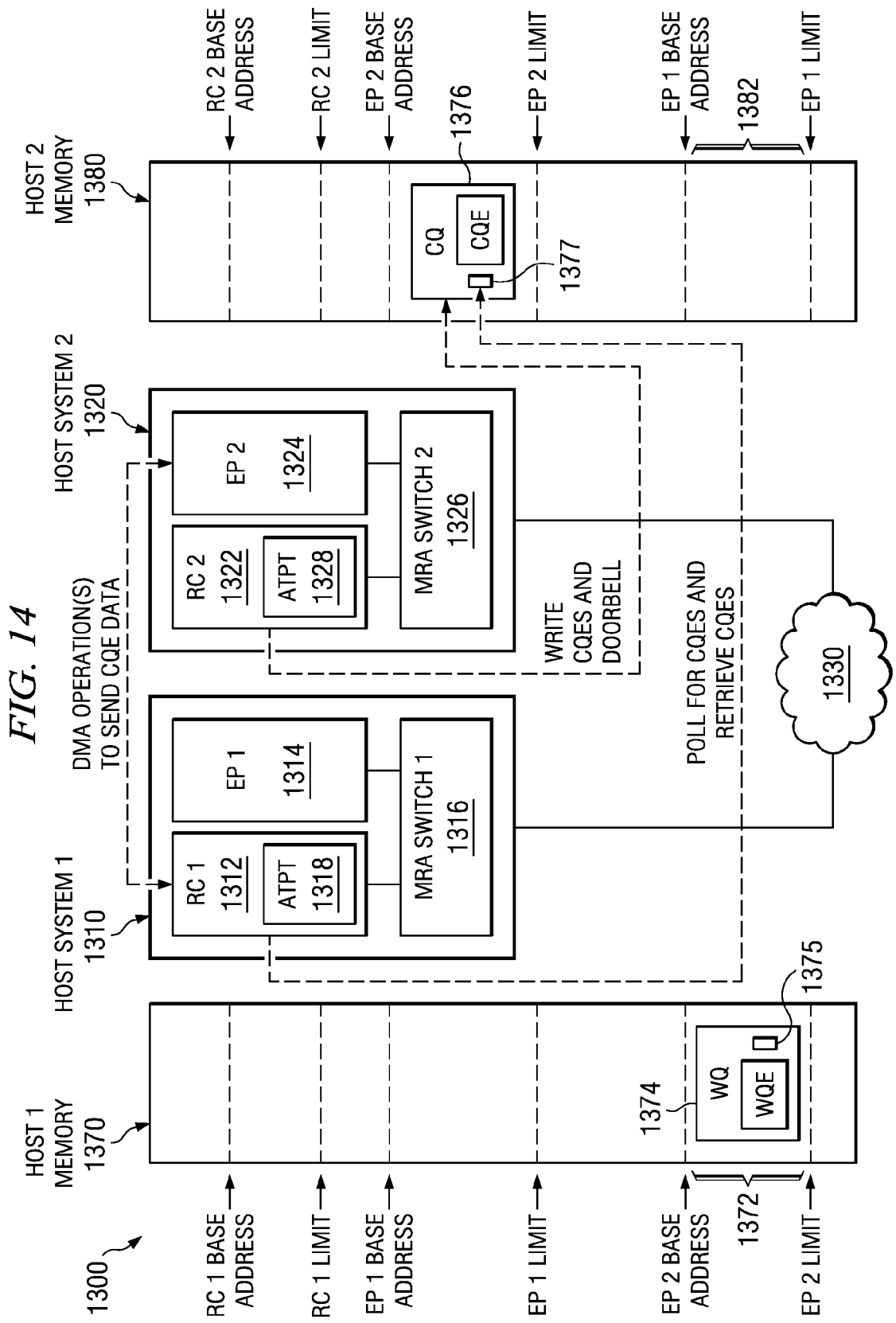
FIG. 14 is an exemplary block diagram illustrating a process for sending a completion queue element (CQE) from the second host system to the first host system in accordance with one illustrative embodiment.

FIG. 14 is an exemplary block diagram illustrating a process for sending a completion queue element (CQE) from the second host system 1320 to the first host system 1310 in accordance with one illustrative embodiment. As shown in FIG. 14, once the work associated with a WQE, or group of WQEs, is completed, the endpoint EP2 1324 performs one or more PCIe DMA operations to root complex RC1 1312 to send one or more CQEs to the root complex RC1 1312. The doorbell may be used in the sense that RC1 1312 may poll or wait for an interrupt indicating a CQE is available.

Each DMA operation uses the first host system's PCIe memory bus address space and places the results into memory 1370 on the first host system 1310 that is accessible on the first host system 1310 through its real memory address space. The results are preferably stored in a DMA-addressable portion of memory 1370, the DMA-addressable portion being at different locations in memory 1370 depending upon the particular OS utilized.

Figure 15:
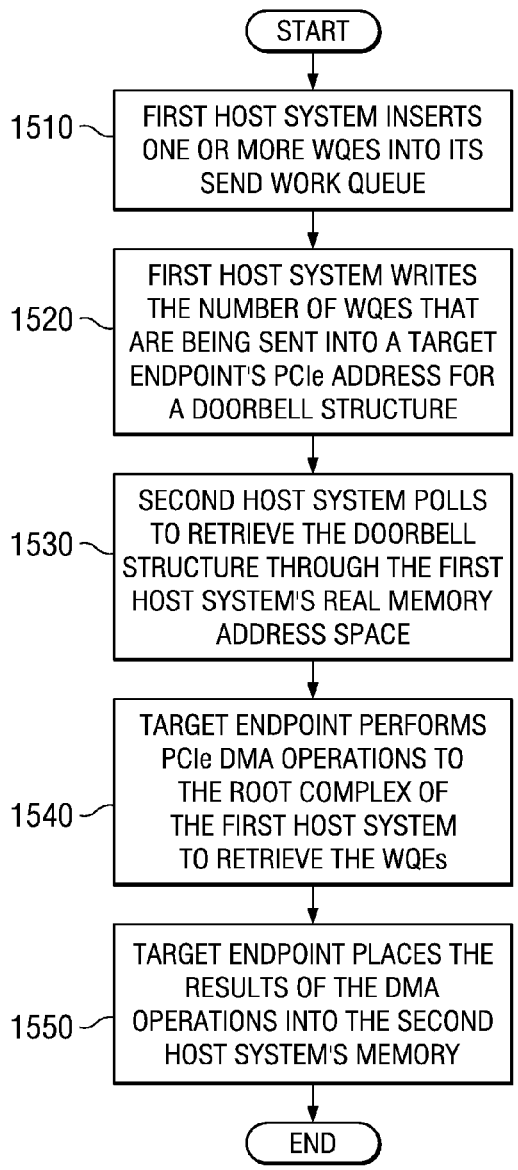
FIG. 15 is an exemplary flowchart outlining an exemplary operation for transmitting a WQE between a root complex of a first host system and an endpoint associated with a second host system in accordance with one illustrative embodiment.

FIG. 15 is an exemplary flowchart outlining an exemplary operation for transmitting a WQE between a root complex of a first host system and an endpoint associated with a second host system in accordance with one illustrative embodiment. As shown in FIG. 15, the operation starts with a first host system inserting one or more WQEs into its send work queue (step 1510). The first host system then writes the number of WQEs that are being sent into a target endpoint's PCIe address for a doorbell structure (step 1520). When the doorbell write operation completes, a second host system either polls, or gets an interrupt and then polls, to retrieve the doorbell structure through the first host system's real memory address space (step 1530).

The target endpoint then performs PCIe DMA operations to the root complex of the first host system to retrieve the WQEs (step 1540). The target endpoint then places the results of the DMA operations into the second host system's memory (step 1550). The operation then terminates.

Figure 16:
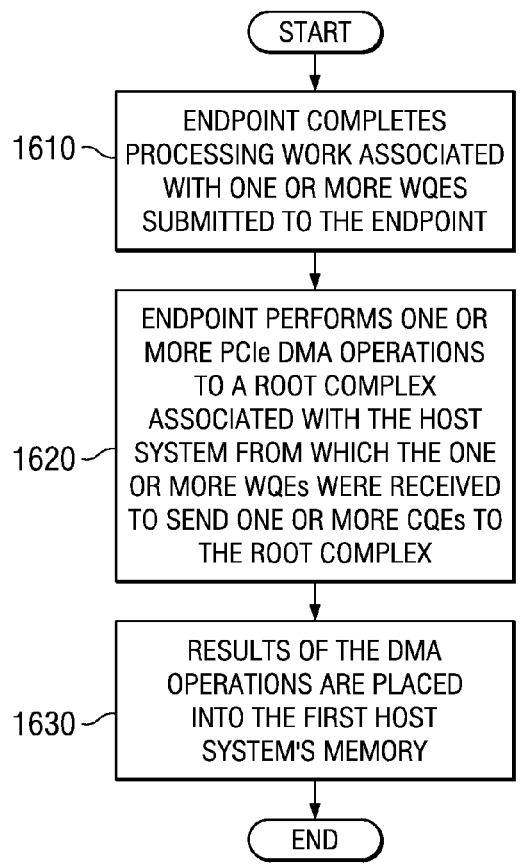
FIG. 16 is an exemplary flowchart outlining an exemplary operation for transmitting a CQE from an endpoint of a second host system to a root complex of a first host system in accordance with one illustrative embodiment.

FIG. 16 is an exemplary flowchart outlining an exemplary operation for transmitting a CQE from an endpoint of a second host system to a root complex of a first host system in accordance with one illustrative embodiment. The operation starts with an endpoint completing the processing work associated with one or more WQEs submitted to the endpoint (step 1610). The endpoint then performs one or more PCIe DMA operations to a root complex associated with the host system from which the one or more WQEs were received to send one or more CQEs to the root complex (step 1620). The results of the DMA operations are placed into the first host system's memory (step 1630). The operation then terminates.

Thus, the shared memories of the illustrative embodiments may be used to provide a queuing structure through which work requests and completion messages may be exchanged between root complexes and endpoints on different host systems. Thus, a root complex may communicate with endpoints on host systems different from the host system on which the root complex is provided, and vice versa.

In accordance with the illustrative embodiments herein, a transaction oriented protocol may be established for using the shared memories of the illustrative embodiments to communicate between root complexes and endpoints of the same or different host systems. The transaction oriented protocol specifies a series of transactions to be performed by the various elements, e.g., root complex or endpoint, to push or pull data, as will be described hereafter.

Returning to FIG. 13, the description above regarding the manner by which WQEs are provided to an endpoint and CQEs are returned to a root complex is one example of a pull-pull-push protocol. That is, the endpoint EP2 1324 of the second host system 1320, in response to the writing of the doorbell structure 1375 by the first host system 1310, uses PCIe DMA operations to pull the WQEs from the first host system's shared memory 1370. These WQEs provide the "commands" for the operations that are to be performed. Based on the segment information stored in the WQEs, the endpoint EP2 1324 of the second host system 1320 pulls the corresponding data from work queue structure 1374 in the first host system's shared memory 1370. Once the work corresponding to the WQEs is complete, the endpoint EP2 1324 of the second host system 1320 pushes a CQE to the root complex RC1 1312 of the first host system 1310 using one or more PCIe DMA operations. Thus, a pull-pull-push transaction protocol is utilized in the example of FIG. 13 described above.

Figure 17:
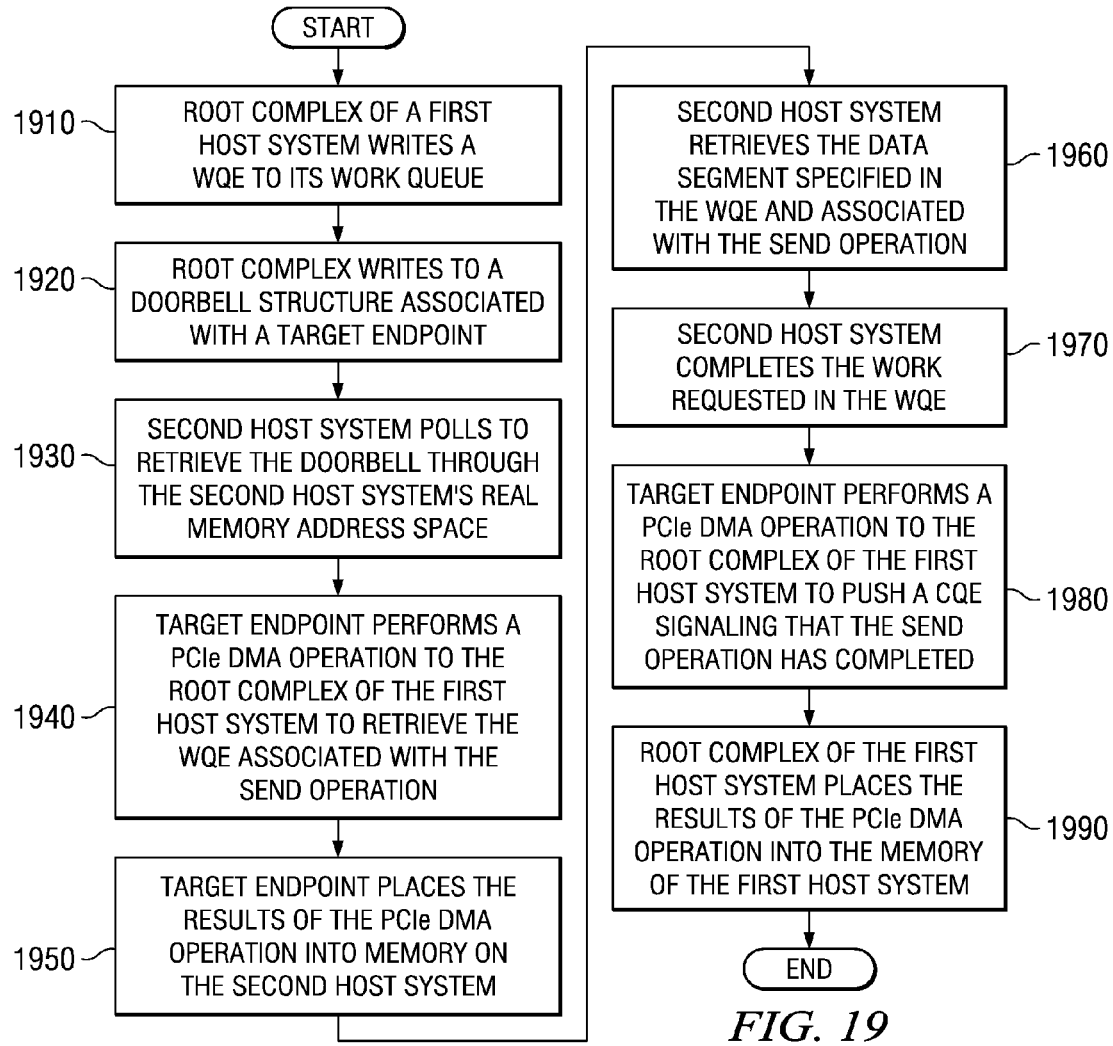
FIG. 17 is an exemplary table illustrating the various possible combinations of transactions that may be used to perform communications between root complexes and endpoints of the same or different host systems.

Other possible combinations of the pull and push transactions are possible for the establishment of different transaction protocols. FIG. 17 is an exemplary table illustrating the various possible combinations of transactions that may be used to perform communications between root complexes and endpoints of the same or different host systems. As shown in FIG. 17, any combination of pull and push transactions may be utilized with the mechanisms of the illustrative embodiments to thereby establish a transaction protocol for the use of the shared memories of the illustrative embodiments.

The root complex and the endpoints are responsible for enforcing a selected protocol. For example, the OS system stack and the endpoints perform the operations for pulling and pushing data as part of the selected transaction protocol, such as previously described. The selection of a protocol to utilize is dependent on the particular PCIe fabric utilized by the endpoints, e.g., InfiniBand or Ethernet fabric. The particularities of the protocol may be determined according to a programming choice, e.g., whether to use polling, interrupt processing, or a combination of polling and interrupt processing.

The mechanisms of the illustrative embodiments may further be used to support socket protocol based communication between root complexes and endpoints of the same or different host systems via the shared memories described above. Such socket protocols may be used when a constant connection is to be present. The determination as to whether to use socket protocols or transaction-based protocols, such as the push-pull transactions described above, may be made based on desired efficiency and reliability.

With socket protocols, a work queue in the host systems may be used to listen for incoming socket initialization requests. That is, a first host system that wishes to establish a socket communication connection with a second host system may generate a socket initialization request WQE in its work queue and informs the second host system that the socket initialization request WQE is available for processing. The second host system may then accept or deny the request. If the second host system accepts the request, it returns the second half of the socket's parameters for use by the first host system in performing socket based communications between the first and second host systems. Such communications may involve, for example, pull transactions and/or push transactions between the host systems.

Figure 18:
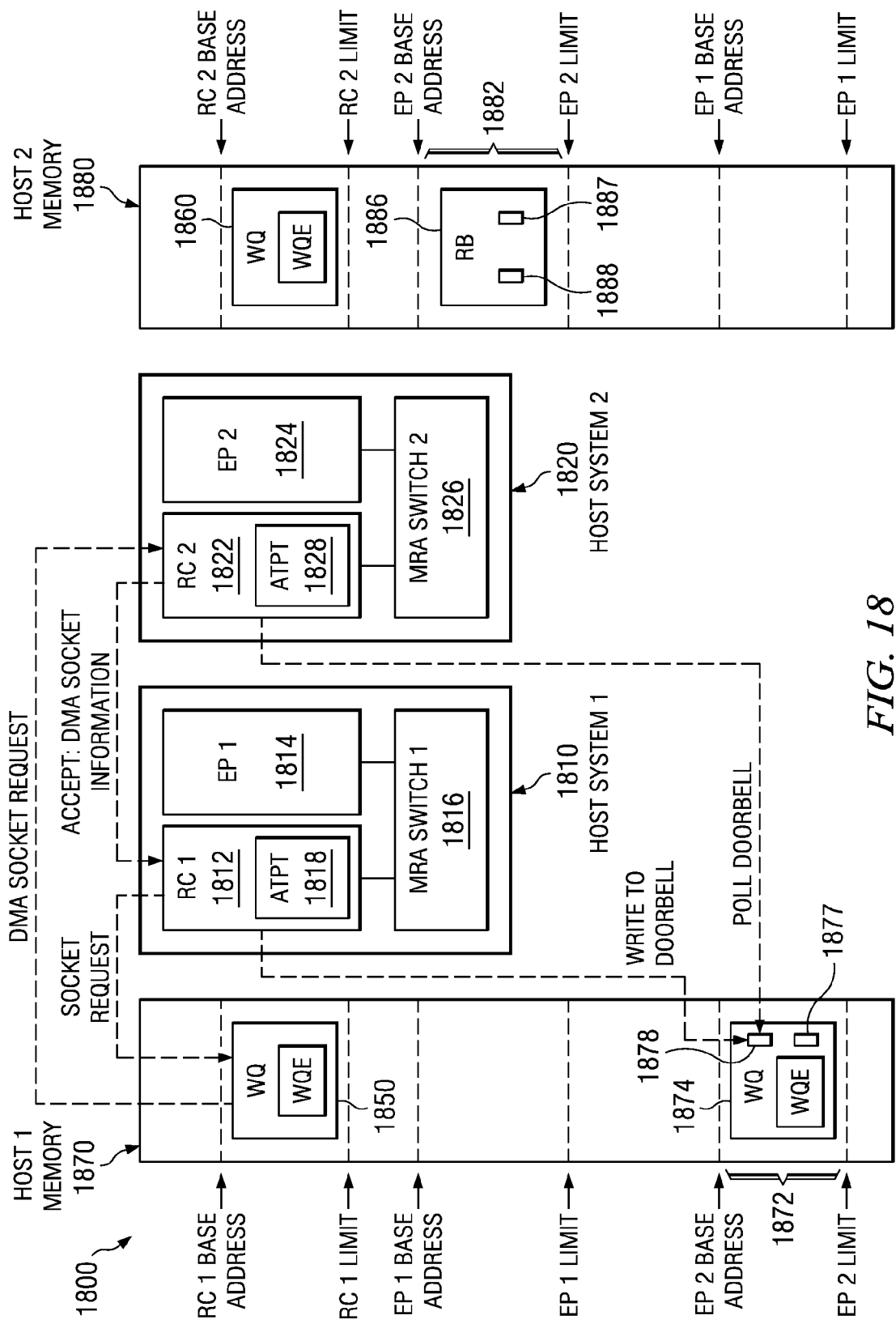
FIG. 18 is an exemplary block diagram illustrating a process for establishing sockets and performing socket-based communication between a first host system to a second host system in accordance with one illustrative embodiment.

FIG. 18 is an exemplary block diagram illustrating a process for establishing sockets and performing socket-based communication between a first host system and a second host system in accordance with one illustrative embodiment. In a socket based implementation of the illustrative embodiments, endpoints, such as EP2 1824, on a host system, e.g., host system 1810, contain a receive buffer 1876, a buffer full flag 1877, and a doorbell structure 1878. The buffer full flag 1877 and the doorbell structure 1878 may comprise addresses in memory that serve to indicate that an event has happened. The transmitter host system, e.g., host system 1810, writes to the doorbell structure 1878 through a PCIe aperture 1872 in the memory 1870 of the receiver host system 1820 accessible by the transmitter host system's root complex RC1 1812, corresponding to the connecting endpoint, e.g., endpoint EP2 1824.

As described previously, during initialization of the shared memories of the host system to facilitate the sharing of endpoints across a plurality of root complexes on the same or different host systems, vital product data (VPD) information is read for each of the discovered root complexes and endpoints in order to generate the virtual PCI tree data structures. This VPD information may include a field indicating whether the particular root complex or endpoint supports sockets over PCIe. This information may be used to identify with which endpoints sockets may be established for socket-based communication in accordance with one illustrative embodiment.

Thus, during initialization, the first host system 1810 may determine that the endpoint EP2 1824 supports sockets over PCIe, for example, through a vendor specific field in the VPD for endpoint EP2 1824, the VPD information in the EP being accessible by the MR-PCIM as previously described above as well as by the host system itself. Similarly, the second host system 1820 may determine that the endpoint EP1 1814 supports sockets over PCIe through its vendor specific field in the VPD information for endpoint EP1 1814.

Each host system 1810 and 1820 has a work queue (WQ) 1850 and 1860 that it uses to listen for incoming sockets initialization requests. For example, the second host system 1820, i.e. the receiving host system, either blocks and waits for a socket initialization request to surface on its work queue 1860 or polls the doorbell structure 1878 of the endpoint EP2 1824 to determine if a socket initialization request has arrived. The socket initialization request contains a base, limit, and starting offset into the work queue 1850 to be used for the first host system's half of the socket.

The first host system 1810, i.e. the sending host system, may generate a socket initialization request in its work queue 1850 and may write into the endpoint EP2 1824 doorbell structure 1878 indicating a socket initialization request WQE is available. Upon retrieving the data in the doorbell structure 1878, the second host system's endpoint EP2 1824 may perform a PCIe DMA operation to retrieve the socket initialization request from the first host system's work queue 1850 using the root complex RC1's PCIe bus memory addresses which are accessible by the endpoint EP2 1824.

The second host system 1820 may then parse the socket initialization request and determine whether to accept or deny the socket initialization request in an application or operating system specific manner. If the second host system 1820 denies the socket initialization request, the second host system 1820 sends a non-connection response PCIe DMA to the first host system's root complex RC1 1812 and, if desired, interrupts the first host system's root complex RC1 1812.

If the second host system 1820 accepts the socket initialization request, the endpoint EP2 1824 performs a PCIe DMA operation to the first host system's root complex RC1 1812 indicating the second half of the socket's parameters, i.e. the base, limit, and starting offset into the work queue 1860 to be used for the second host system's half of the socket.

Once the socket has been initialized in the manner described above, send/receive operations may be performed using the established socket in one of two ways: pull transactions or push transactions. With a pull transaction, the root complex RC1 1812 of the first host system 1810 performs send operations by writing a WQE to its work queue 1850 and then writing to a doorbell structure 1878 associated with the endpoint EP2 1824, which is accessible through root complex RC1 1812 PCIe bus memory address space. When the doorbell write operation completes, the second host system 1820 either polls or gets an interrupt and then polls to retrieve the doorbell structure 1878 through the second host system's real memory address space. The endpoint EP2 1824 then performs a PCIe DMA operation to the root complex RC1 1812 to retrieve the WQE associated with the send operation. The PCIe DMA operation uses the first host system's PCIe memory bus address space and places the results into memory 1880 on the second host system that is accessible through the second host system's real memory address space. The second host system 1820 then retrieves the data segment specified in the WQE and associated with the send operation.

When the second host system completes the work requested in the WQE, the endpoint EP2 1824 performs a PCIe DMA operation to the root complex RC1 1812 to push a CQE signaling that the send operation has completed. This DMA operation uses the first host system's PCIe memory bus address space and places the results into memory 1870 on the first host system 1810 that is accessible through the first host system's real memory address space.

For a push transaction, the root complex RC2 1822 writes into a doorbell structure 1888 for endpoint EP1 1814 indicating the number of receive WQEs it has available. When the endpoint EP1 1814 has data to send, the endpoint EP1 1814 checks to determine if the endpoint EP1 1814 has any receive WQEs available on the work queue 1860 of root complex RC2 1822. If there are no available receive WQES, the root complex RC1 1812 writes into the endpoint EP2's buffer full flag 1887 to indicate that the first host system 1810 has data to send on the socket and the second host system 1820 needs to post some buffers through receive WQEs for that socket.

If there are available receive WQEs, the second endpoint EP2 1824 performs a PCIe DMA operation to the root complex RC1 1812 to retrieve the next WQE available on the root complex RC1's work queue 1850. The DMA operation uses the first host system's PCIe memory bus address space and places the results into memory 1880 on the second host system 1820 that is accessible through the second host system's real memory address space. The second host system 1820 then sends its data to the data segments passed in the receive WQE.

When the second host system 1820 completes the work requested, the endpoint EP2 1824 then performs a PCIe DMA operation to the root complex RC1 1812 to push a CQE signaling that the send operation has completed. This DMA operation uses the first host system's PCIe memory bus address space and places the results into memory on the first host system 1810 that is accessible through the first host system's real memory address space.

FIG. 19 is a flowchart outlining an exemplary operation for performing a pull transaction using a socket based communication connection in accordance with one illustrative embodiment. The operation starts with a root complex of a first host system writing a WQE to its work queue (step 1910) and then writing to a doorbell structure associated with a target endpoint (step 1920). When the doorbell write operation completes, the second host system either polls or gets an interrupt and then polls to retrieve the doorbell through the second host system's real memory address space (step 1930).

The target endpoint then performs a PCIe DMA operation to the root complex of the first host system to retrieve the WQE associated with the send operation (step 1940). The target endpoint places the results of the PCIe DMA operation into memory on the second host system (step 1950). The second host system then retrieves the data segment specified in the WQE and associated with the send operation (step 1960).

In response to the second host system completing the work requested in the WQE (step 1970), the target endpoint performs a PCIe DMA operation to the root complex of the first host system to push a CQE signaling that the send operation has completed (step 1980). The root complex of the first host system places the results of the PCIe DMA operation into the memory of the first host system (step 1990). The operation then terminates.

Figure 20:
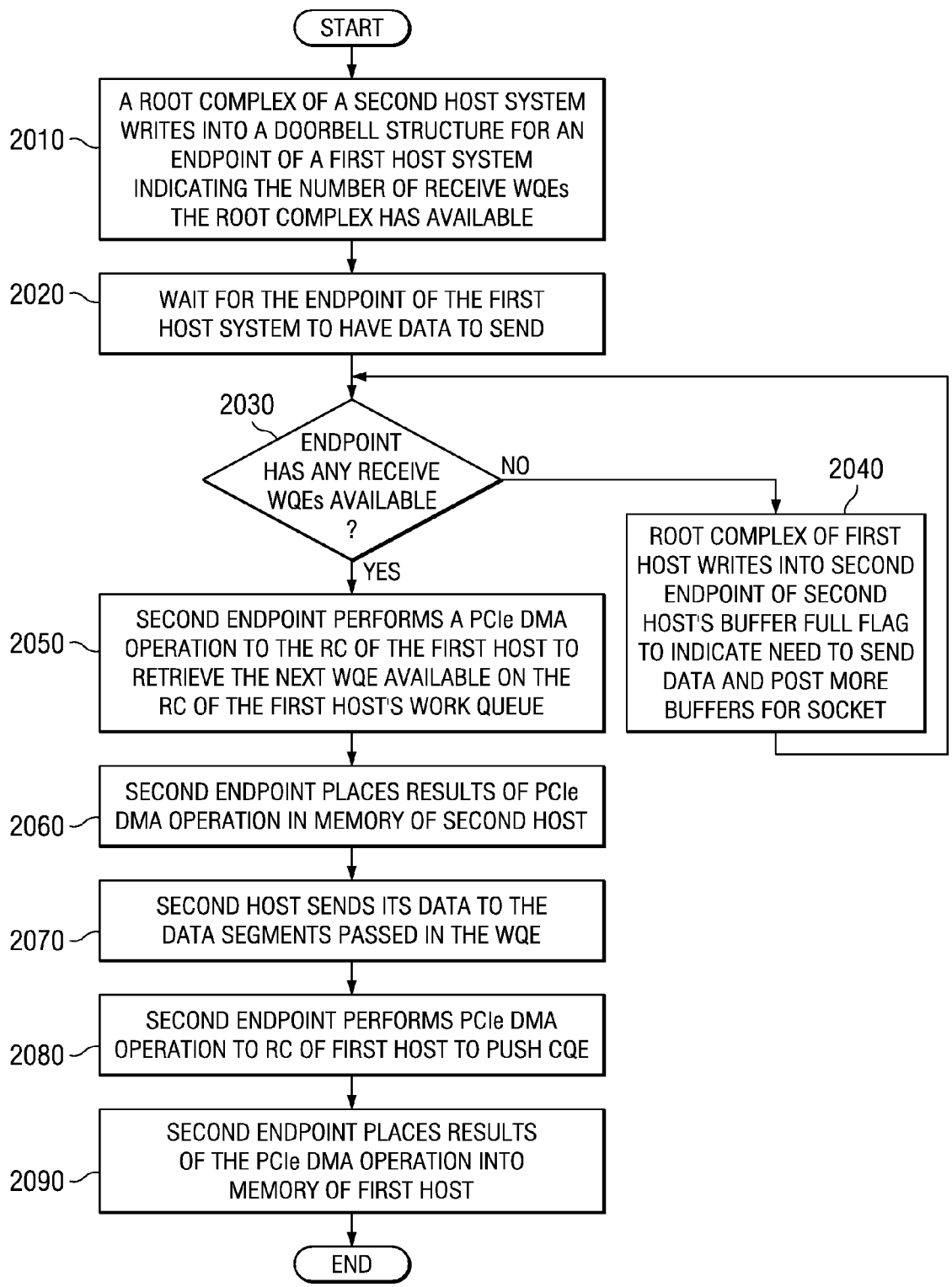
FIG. 20 is a flowchart outlining an exemplary operation for performing a push transaction using a socket based communication connection in accordance with one illustrative embodiment.

FIG. 20 is a flowchart outlining an exemplary operation for performing a push transaction using a socket based communication connection in accordance with one illustrative embodiment. A root complex of a second host system writes into a doorbell structure for an endpoint of a first host system, indicating the number of receive WQEs the root complex has available (step 2010). In response to the endpoint of the first host system having data to send (step 2020), the endpoint of the first host system checks to determine if the endpoint has any receive WQEs available on the work queue of root complex of the second host system (step 2030). If there are no available receive WQEs, the root complex of the first host system writes into a second endpoint of the second host system's buffer full flag to indicate that the first host system has data to send on the socket and the second host system needs to post some buffers through receive WQEs for that socket (step 2040). The operation then returns to step 2030)

If there are available receive WQEs, the second endpoint performs a PCIe DMA operation to the root complex of the first host system to retrieve the next WQE available on the root complex of the first host system's work queue (step 2050). The second endpoint places the results of the PCIe DMA operation into the memory of the second host system (step 2060). The second host system then sends its data to the data segments passed in the receive WQE (step 2070).

When the second host system completes the work requested, the second endpoint performs a PCIe DMA operation to the root complex of the first host system to push a CQE signaling that the send operation has completed (step 2080). The second endpoint places the results of the PCIe DMA operation into memory on the first host system (step 2090). The operation then terminates.

As discussed above, the endpoints of a multi-root system may support one or more physical functions having one or more associated virtual functions. The mechanisms of the illustrative embodiments, in addition to providing for the communication between root complexes and endpoints of the same or different host systems, also provides mechanisms for managing the physical and virtual functions of an endpoint. One function provided by the mechanisms of the illustrative embodiments provides the ability to migrate a single root stateless virtual function and its associated application from one physical function to another on the same endpoint. This migration functionality is important to satisfying the growing demand for workload balancing capabilities in the realm of system management.

By migrating the VF and its associated application(s) (which are applications that depend on the VF to operate) different resources can be recruited to continue operations in a more efficient environment. For example, with workload balancing, an Ethernet VF and its associated dependent application may be moved using the mechanisms of the illustrative embodiments to take advantage of a faster (e.g., less congested) connection available on a different PF that may be associated with a different SI or even EP altogether.

Figure 21A:
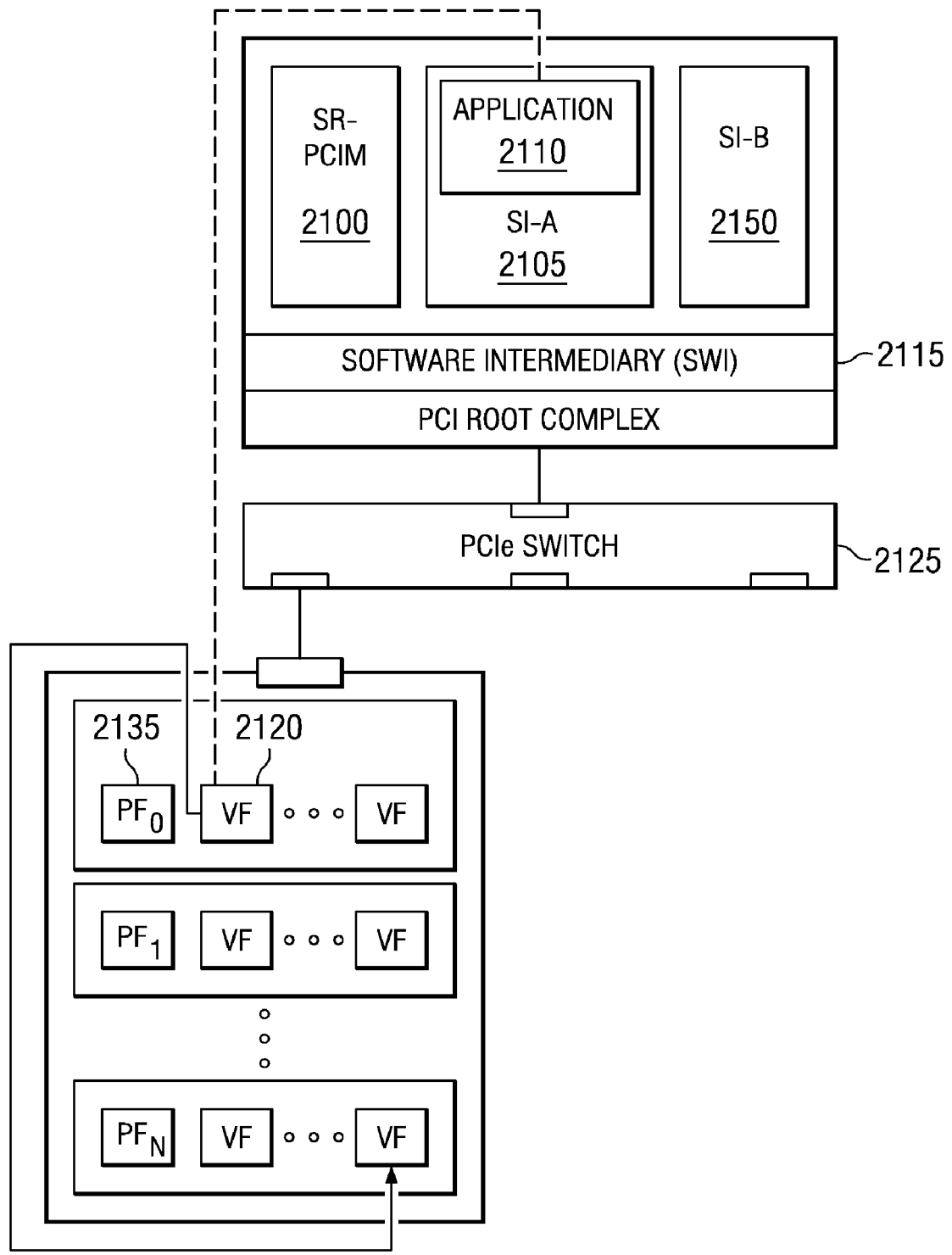
FIGS. 21A and 21B are exemplary diagrams illustrating a single root stateless migration of a virtual function and its associated application from one physical function to another on the same PCIe adapter in accordance with one illustrative embodiment.
Figure 21B:
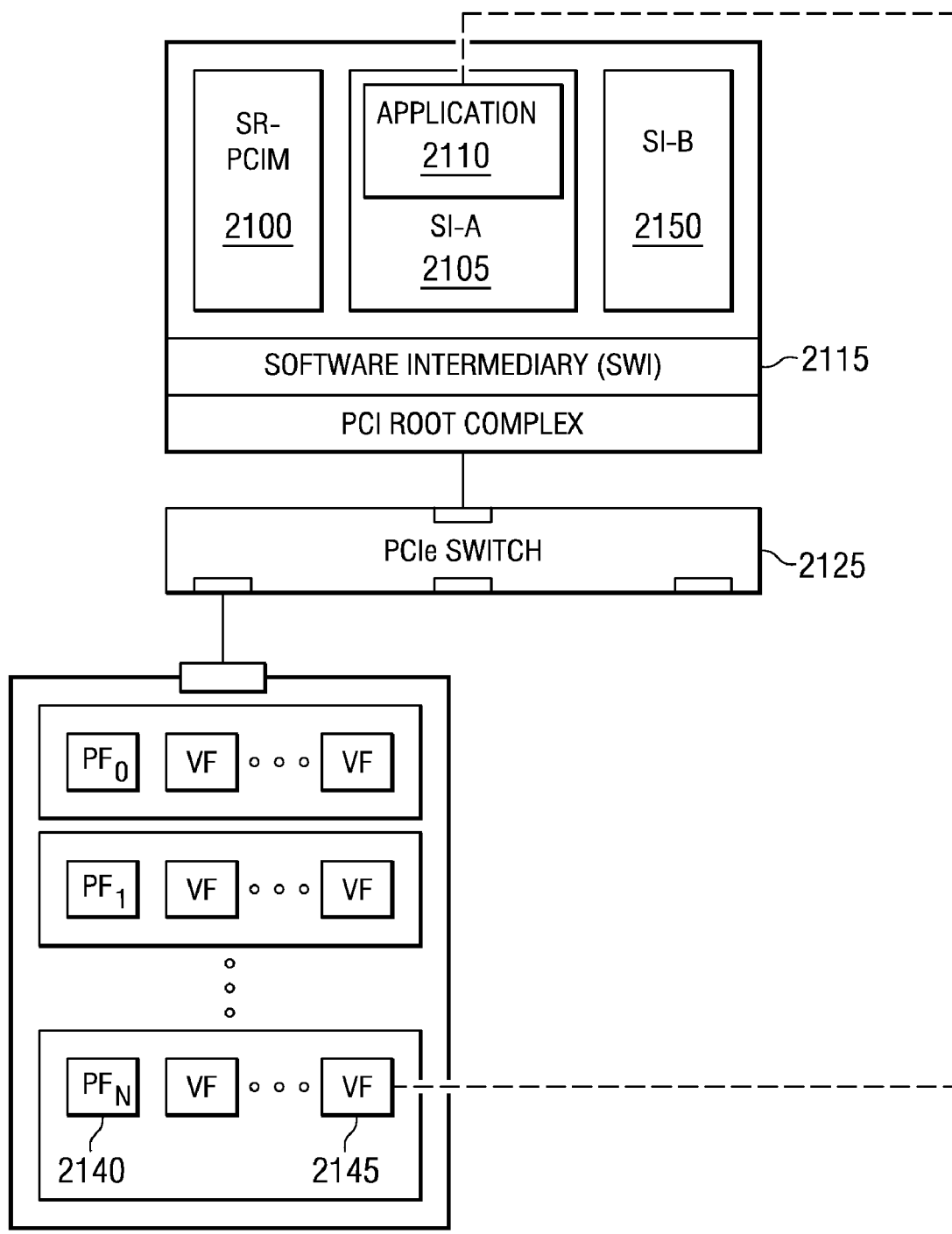

FIGS. 21A and 21B are exemplary diagrams illustrating a single root stateless migration of a virtual function and its associated application from one physical function to another on the same endpoint, e.g., PCIe adapter, in accordance with one illustrative embodiment. As shown in FIG. 21A, an application 2110, associated with system image (SI) 2105, is associated with a virtual function (VF) 2120 as represented by the dashed line connecting element 2110 with 2120. A software intermediary 2115, based on information from the SR-PCIM

2100, may depict migration scenarios to the system administrator or equivalent administrating authority. This may include, but is not limited to showing equivalent VFs that are available in the PCIe fabric that could be targets for migration via a systems management interface (not depicted).

The particular migration scenarios that may be depicted by SR-PCIM 2100 may be determined, for example, based on a VF migration capability bit that the SR-PCIM accesses to determine if a particular VF may be migrated or not. Based on this information from the SR-PCIM 2100, the SWI 2115 may interpret and translate this data into VF migration scenarios available to the user through a management console or entity. These migration scenarios will be highly dependent on the design of the components in question. For example, in order to migrate an Ethernet adapter, an OS may have to be able to de-configure it. If this functionality is not provided by the OS, then the management utility will not be able to depict such a scenario. In other words, the management utility maintains knowledge of the components (System Image type, Hardware, etc.) which it then uses to depict migration scenarios. This information, in addition with the migratability information stored in the VF migration capability bit, identifies which scenarios for migration are available for selection.

The system administrator starts the process to migrate a desired VF 2120 and associated application 2110. For example, management software (not depicted), may depict the VFs and their associated applications as entities, such as in a graphical user interface display, that can be migrated between available resources on the host system and the PCIe fabric. The management software can exist on a hardware management console, such as the HMC available from International Business Machines Corporation, or in any other console or part of the system running software designed to interact with firmware (e.g., software intermediaries or hypervisors), and control functions of the hardware resources.

A software intermediary (SWI) 2115, which may be any type of firmware or software code that is used between a management application and the hardware to create a layer of abstraction that allows for additional functionality, running on the host system may send a request to the SI-A 2105 that all outstanding requests be completed for or flexibility, the VF 2120 to be migrated. For example, the SI-A 2105 and the SWI 2115 may have application program interfaces (APIs) through which they communicate. The SI-A 2105 may respond to the request by pausing or stopping any application 2110 using the VF 2120. The SI-A 2105 may ensure that all outstanding requests to the VF 2120 are completed. Essentially, the SI-A 2105 checks to make sure that all queues are in a state that represents that no requests are pending and that all transactions have been completed. For example, one way to do this is to check that all WQEs have a corresponding CQE.

The SI-A 2105 may then de-configure its logical representation of the VF 2120, effectively stopping the SI-A's use of the VF 2120. This is an operation that may be performed, for example, by a device driver (not shown) for the VF 2120 on the SI-A 2105. The SI-A 2105 may then notify the SWI 2115 that all requests have been completed and that the VF 2120 can be removed. The SWI 2115 may in turn remove the VF 2120 from the SI-A 2105. This will render the VF 2120 undetectable and un-configurable by the SI-A 2105. The SWI 2115 may now detach the VF 2120 from the target physical function (PF) 2135 by clearing out the VF's representation in the configuration space of the endpoint.

Referring now to FIG. 21B, the SWI 2115 may then attach the target VF 2145 to its PF 2140. The SWI 2115 may then make the VF 2145 available to the SI-A 2105 for configuration and instructs the SI-A 2105 to configure the VF 2145. For example, the SWI 2115 updates the SI-A's device tree in firmware to include a new device, e.g., the VF 2145 which may appear to be a new endpoint, for example. This new endpoint, or VF 2145, may be any type of endpoint device whose logical representation in the OS is dependent on a device driver finding it in SI-A's device tree which is presented to the OS by the firmware code. Once there is an entry in SI-A's device tree for the new device, e.g., the VF 2145, a device driver for that device will detect and configure the new device.

Once the SI-A 2105 configures the VF 2145 using, for example, a device driver, the associated application 2110 may then be able to use the VF 2145. The SWI 2115 may now instruct the SI-A 2105 to start the associated application 2110 completing the migration. As a result, the application 2110 and the VF 2120 are still associated, as represented by the dashed line, but the VF 2120 has been migrated from its association with PF 2135 to now be associated with PF 2140.

Figure 22A:
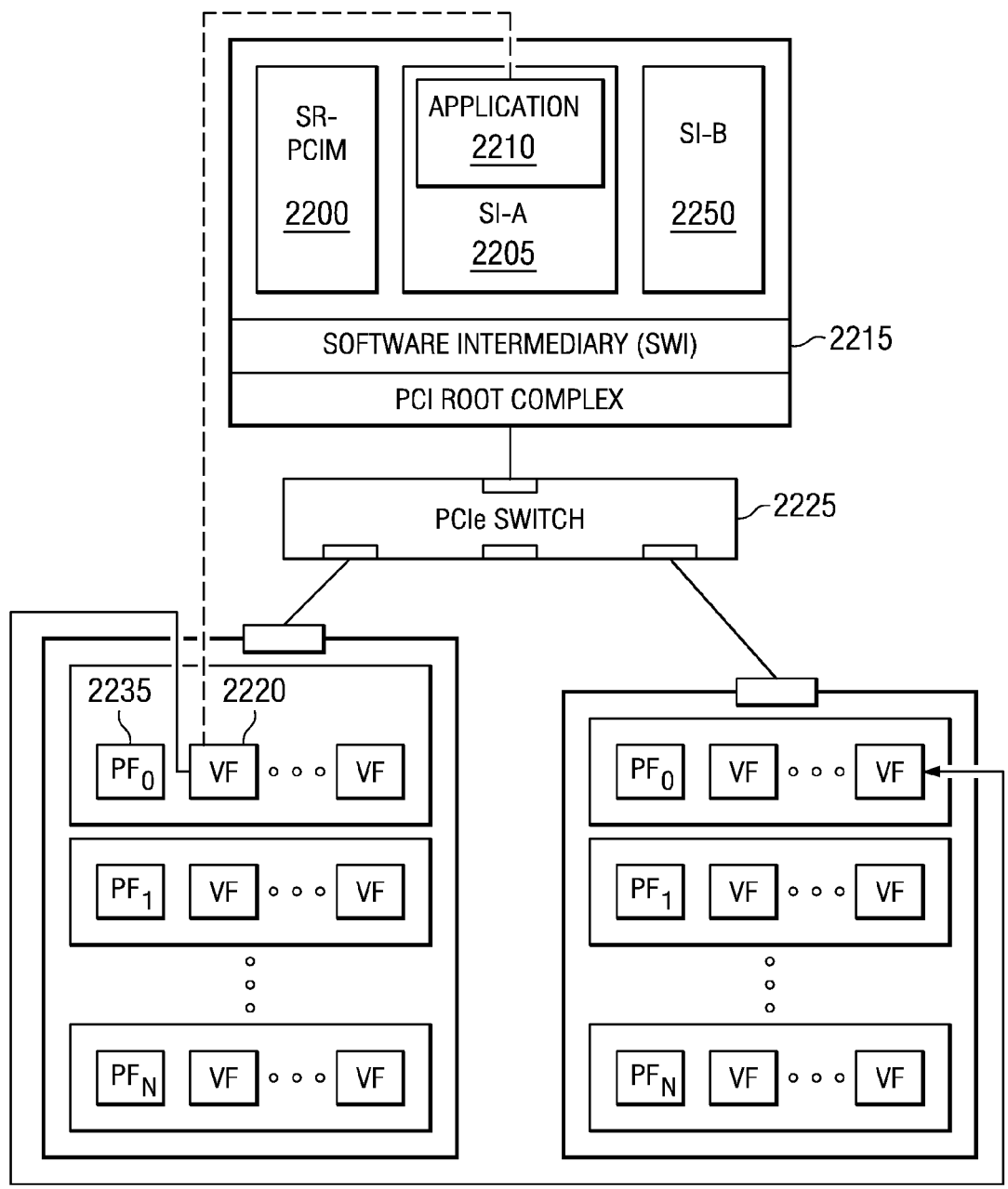
FIGS. 22A and 22B are exemplary diagrams illustrating a single root stateless migration of a virtual function and its associated application from one PCIe adapter to another in accordance with one illustrative embodiment.
Figure 22B:
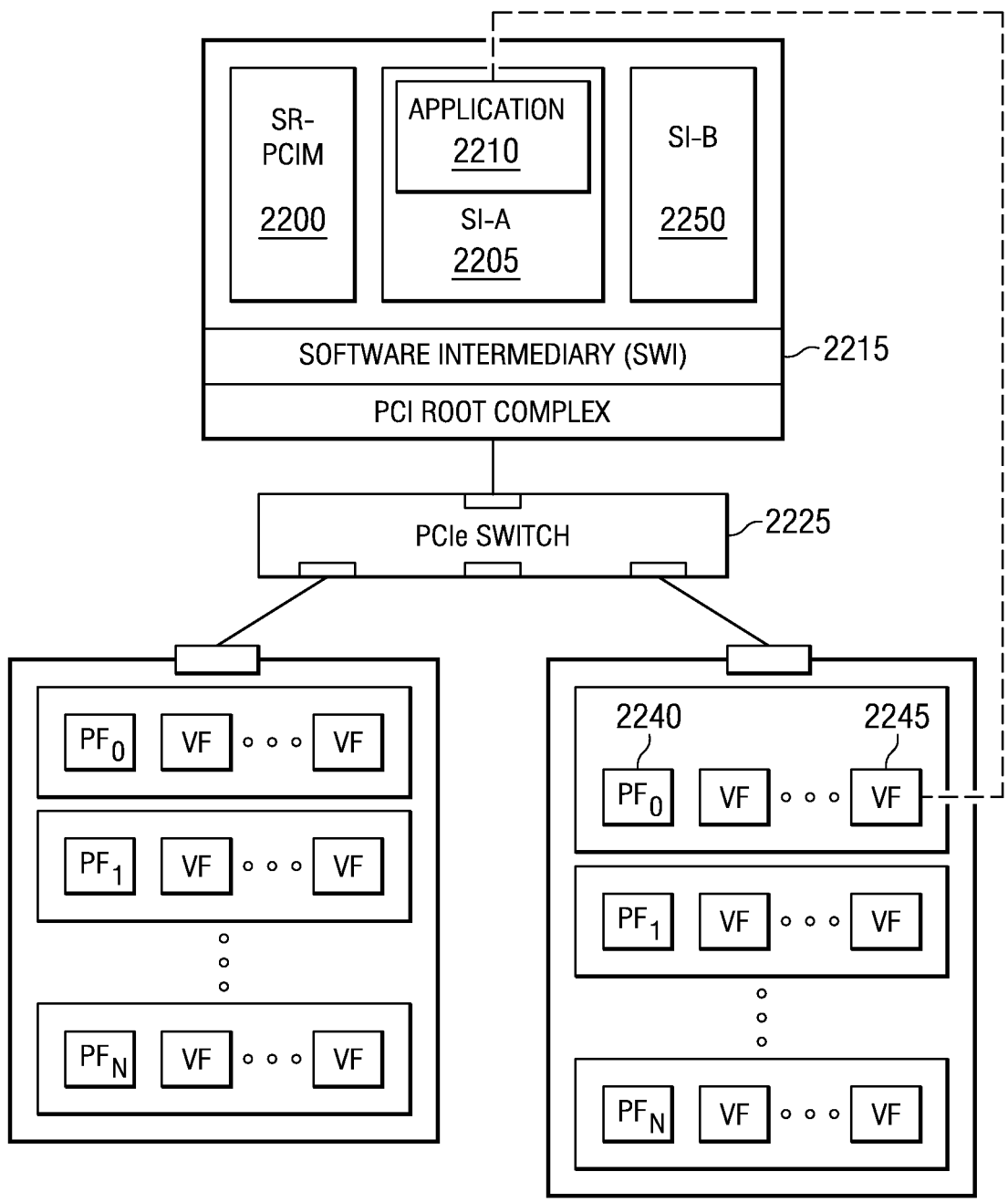

FIGS. 22A and 22B are exemplary diagrams illustrating a single root stateless migration of a virtual function (VF) and its associated application from one endpoint, e.g., PCIe adapter, to another in accordance with one illustrative embodiment. The operation for stateless migration of a VF from one endpoint to another is similar to that described above with regard to FIGS. 21A and 21B. The main difference between the operation of FIGS. 21A-21B and that of FIGS. 22A-22B is that the VF is placed in a different endpoint altogether rather than only being associated with a different physical function within the same endpoint.

As shown in FIG. 22A, an application 2210, associated with system image (SI) 2205, is associated with a virtual function (VF) 2220 as represented by the dotted line connecting element 2210 with 2220. A SR-PCIM 2200 depicts migration scenarios to the system administrator or equivalent administrating authority. This may include, but is not limited to showing equivalent VFs that are available in the PCIe fabric that could be targets for migration via a systems management interface (not depicted).

The system administrator starts the process to migrate the desired VF 2220 and associated application 2210. For example, management software (not depicted) may illustrate the VFs and their associated applications as entities, such as in a graphical user interface display of a management console or entity, that can be migrated between available resources on the host system and the PCIe fabric. A software intermediary (SWI) 2215 running on the host system may send a request to the SI-A 2205 that all outstanding requests be completed for the VF 2220 to be migrated. For example, the SI-A 2205 and the SWI 2215 may have application program interfaces (APIs) through which they communicate. The SI-A 2205 may respond to the request by pausing or stopping any application 2210 using the VF 2220. The SI-A 2205 may ensure that all outstanding requests to the VF 2220 are completed.

The SI-A 2205 may then de-configure its logical representation of the VF 2220, effectively stopping the SI-A's use of the VF 2220. This is an operation that may be performed, for example, by a device driver (not shown) for the VF 2220 on the SI-A 2205. The SI-A 2205 may then notify the SWI 2215 that all requests have been completed and that the VF 2220 can be removed. The SWI 2215 may in turn remove the VF 2220 from the SI-A 2205. This will render the VF 2220 undetectable and un-configurable by the SI-A 2205. The SWI 2215 may now detach the VF 2220 from the target physical function (PF) 2235 by clearing out the VF's representation in the configuration space of the endpoint.

Referring now to FIG. 22B, the SWI 2215 may then attach the target VF 2245 to its PF 2240 which is in a different endpoint altogether from the PF 2235 with which the VF 2220 (now VF 2245) was originally associated. The SWI 2215 may then make the VF 2245 available to the SI-A 2205 for configuration and instructs the SI-A 2205 to configure the VF 2245. For example, the SWI 2215 updates the SI-A's device tree in firmware to include the new device. The SI-A 2205 may configure the VF 2245 using, for example, a device driver whose type will depend on the specific properties of the device or function in question. The associated application 2210 may now be able to use the VF 2245. The SWI 2215 may now instruct the SI-A 2205 to start the associated application 2210 completing the migration. As a result, the application 2210 and the VF 2220 are still associated, as represented by the dashed line, but the VF 2220 has been migrated from its association with PF 2235 to now be associated with PF 2240 in a different endpoint.

Figure 23A:
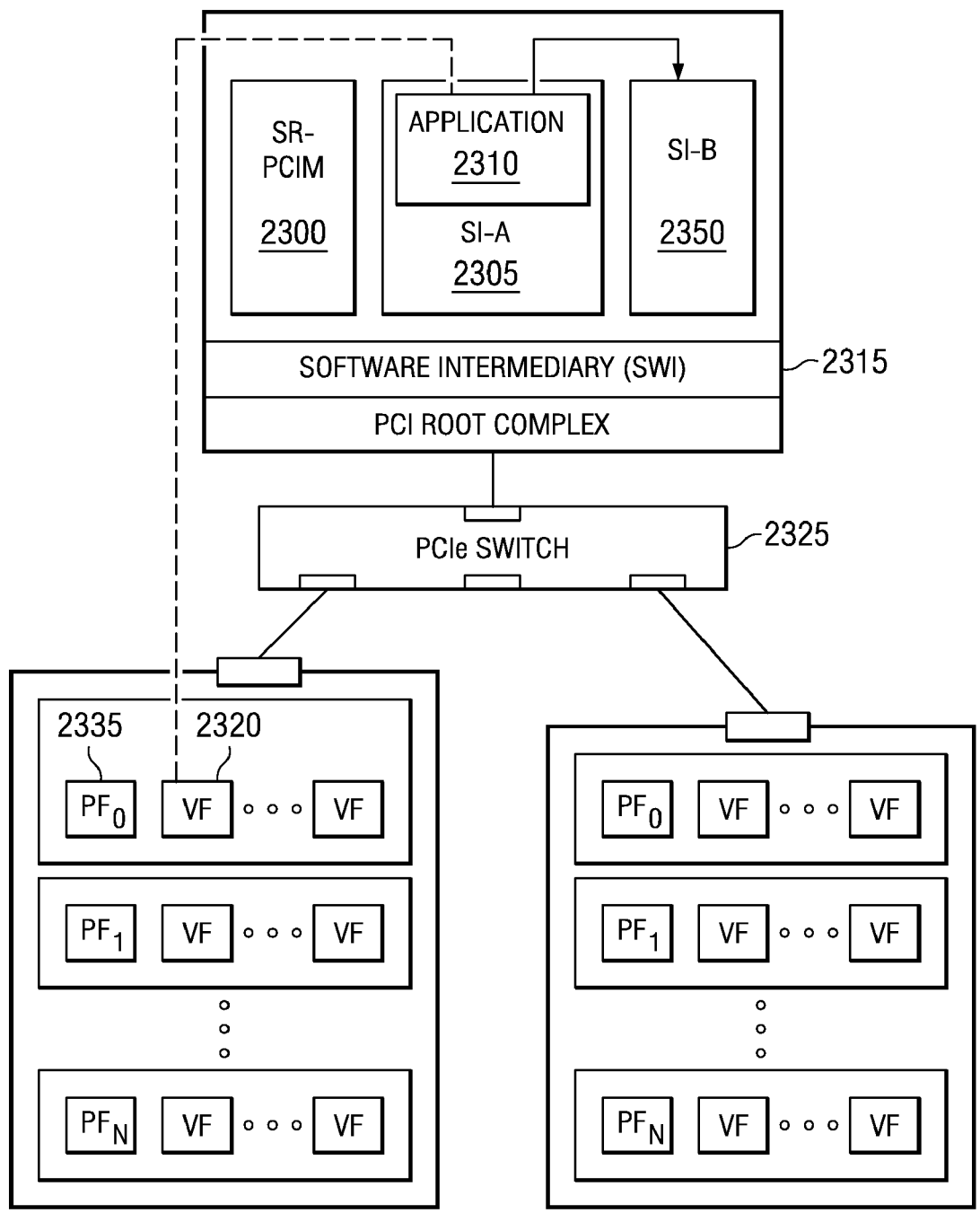
FIGS. 23A and 23B are exemplary diagrams illustrating a single root stateless migration of a virtual function and its associated application from one system image to another in accordance with one illustrative embodiment.
Figure 23B:
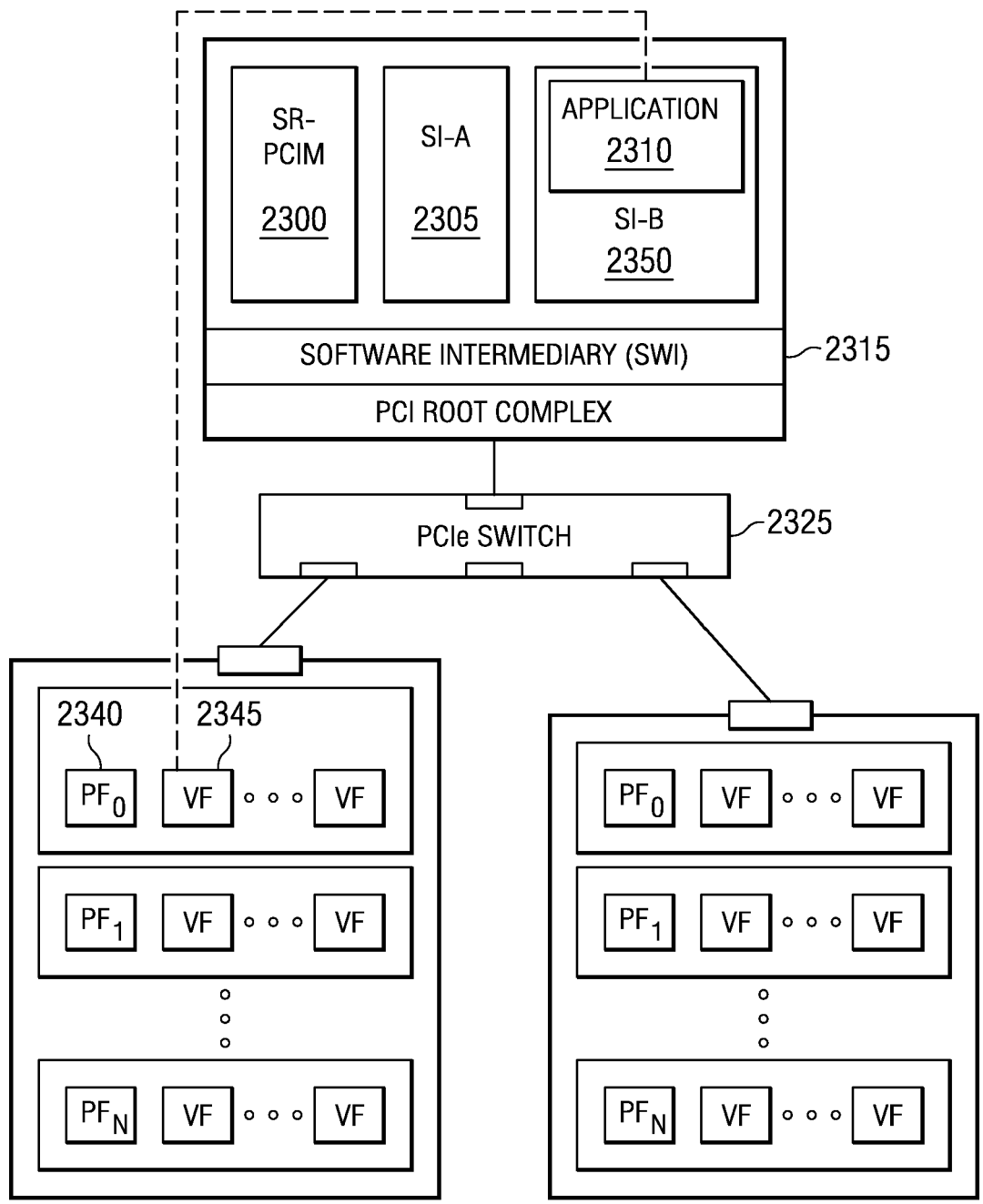

Similar operations may be performed to migrate a virtual function from one system image to another. FIGS. 23A and 23B are exemplary diagrams illustrating a single root stateless migration of a virtual function and its associated application from one system image to another in accordance with one illustrative embodiment. As shown in FIG. 23A, the operation for stopping operations targeting a VF 2320 that is to be migrated is essentially the same as described previously with regard to FIGS. 21A and 22A. Once the application 2310 associated with the VF 2320 is stopped and operations targeting the VF 2320 are completed, the SI-A 2305 de-configures its logical representation of the VF 2320 and notifies the SWI 2315 that all requests have been completed and the VF 2320 may be removed.

If a SI change is to be performed with regard to the VF 2320, the SWI 2315 detaches the VF 2320 from the associated PF 2335 and attaches the VF 2345 to a target PF 2340. The target PF 2340 may be located on the same or different endpoint. The SWI 2315 makes the VF 2345 available to the target SI, e.g., SI-B 2350 for configuration and instructs the target SI 2350 to configure the VF 2345. The target SI 2350 configures the VF 2345 effectively making it available for use by the associated application 2310, now associated with SI-B 2350. The SWI 2315 informs the target SI 2350 to start the associated application to use the resources on the new VF 2345.

FIG. 24 is a flowchart outlining an exemplary operation for migrating a virtual function in accordance with one illustrative embodiment. As shown in FIG. 24, the operation starts with a user specifying a VF to migrate and a target destination for the VF (step 2410). A SWI running on the host system sends a request to the SI that all outstanding requests to the VF be completed in order to migrate the VF (step 2420). The SI pauses or stops any application using the VF (step 2430) and ensures that all outstanding requests to the VF have completed (step 2440). The SI then de-configures its logical representation of the VF (step 2450). The SI notifies the SWI that all requests have been completed and that the VF can be removed (step 2460).

The SWI then removes the VF from the SI and detaches the VF from the associated PF (step 2470). The SWI then attaches the VF to the target PF which may be in the same or different endpoint and may be associated with the same or a different system image (step 2480). The SWI then instructs the SI with which the VF is now associated to configure the VF, thereby making it available for use by an associated application (step 2490). The SWI instructs the SI to start the associated application to use the resources on the new VF (step 2495). The operation then terminates.

Thus, with the mechanisms of the illustrative embodiments, virtual functions may be migrated within the same endpoint, between different endpoints, and between different system images on the same or different endpoints. Such migration makes it possible for various load balancing operations to be performed. Moreover, such migration allows virtual functions to be moved to operating environments that are more conducive to efficient operation of the virtual functions.

Thus, the illustrative embodiments as outlined provide mechanisms for simultaneously sharing an endpoint, e.g., a PCIe I/O adapter, between multiple system images (Sis) within the same root complex or across multiple root complexes (RCs). Moreover, the mechanisms of the illustrative embodiments support the ability to use queue based communication, push-pull based protocol communication, and socket based communication. Furthermore, the illustrative embodiments provide mechanisms for migrating virtual functions and their associated application instances from one physical function to another in the same or different endpoint and from one system image to another.

In addition to these mechanisms, the illustrative embodiments further provide functionality for performing hot-plug/remove of a new component into a running multi-root PCIe fabric. These mechanisms allow a root complex, for example, to be hot-plugged into or removed from a running PCIe fabric. For example, a blade may be hot-plugged into a blade chassis and its associated root complex may be incorporated in real-time into the PCIe fabric in an existing system.

Such hot-plug/remove capability allows the PCIe fabric to grow and for virtual functions to be natively shared across the newly incorporated root complexes. The PCIe fabric may thus expand without bringing down the system in order to do so. The PCI-SIG I/O virtualization standards do not provide any such capability or standard for such dynamic expansion of the PCIe fabric.

With the mechanisms of the illustrative embodiments, it is assumed that there is an existing host system with one or more PCI root complexes and multiple-root aware (MRA) enabled switches. For example, the host system may have two root complexes RC1 and RC2 connected by a PCI fabric having one or more MRA switches. Moreover, it is assumed that there are one or more endpoints coupled to the PCIe fabric which may be configured to communicate with the existing root complexes and with the newly introduced root complex. Furthermore, it is assumed that a multiple root (MR) PCI configuration manager (MR-PCIM), which may reside in-band on one of the host systems or out-of-band, is capable of and has discovered the PCI fabric by traversing all of the links accessible through interconnected switches of the PCIe fabric. All of these assumptions are satisfied by the various mechanisms previously described above with regard to the illustrative embodiments set forth herein.

With the above assumed configuration, when a system administrator, or the like, adds a new root complex to an existing PCIe fabric (e.g., inserts a new blade into a blade chassis), at least one of an automated mechanism, such as a hot-plug controller, or the system administrator, notifies the MR-PCIM, such as via an administrator interface or the like, of the addition of the root complex. Such notification may be made, for example, by posting an event to the MR-PCIM indicating that the action of adding a new entity into the fabric has taken place. Such an event may identify a switch and switch port where the new root complex is now connected to the PCIe fabric, i.e. where the root complex is plugged-in.

The MR-PCIM may then handle the posted event by performing a number of operations to initialize the new root complex in the existing PCIe fabric. For example, the MR- PCIM may update its PCIe fabric configuration data structure with information regarding the newly added component. The PCIe fabric configuration data structure is used by the MR-PCIM to represent the configuration of the PCIe fabric. Information stored in the PCIe fabric configuration data structure is gathered by the MR-PCIM from PCIe fabric configuration registers and from input from a system administrator, via a management user interface with the MR-PCIM, for example. The content of the PCIe fabric configuration data structure and usage of this content will be described more fully, hereafter.

After updating the PCIe fabric configuration data structure, the MR-PCIM then performs PCI configuration space operations, as defined by the PCI specifications, to determine the characteristics of the newly added component, e.g., whether it is an endpoint, a root complex, a switch, etc., what type of endpoint, root complex, switch, etc. it is, and the like, as per the PCI specifications. If it is determined that the newly added component is a switch, the PCI configuration space operations are performed with regard to each port of the switch to determine the existence of additional components coupled to the switch. The characteristic information, e.g., component type, vendor name, part number, serial number, etc., for the newly added component is then stored in the virtual PCIe fabric configuration data structure for use by the MR-PCIM.

If the component is a new root complex or a new endpoint, the MR-PCIM associates the new root complex or endpoint with a virtual plane. In this way, the new root complex or endpoint is made available for use by the system. If the component is a MRA switch, the MR-PCIM configures the switch's virtual plane table, as per the PCI I/O virtualization specifications. If the component is a switch, then the switch ports are checked to see what components, if any, are attached to them and the MR-PCIM configures its PCIe fabric configuration data structure based on information about these components as well in a similar manner. In this way, the new component(s) may be dynamically added to the PCIe fabric.

With regard to a new root complex, having configured the MR-PCIM to include the characteristic information for the new root complex and associated the new root complex with a virtual plane, the new root complex may be used in the PCIe fabric. Thus, the mechanisms of the illustrative embodiments allow root complexes and their associated components to be added to an existing running PCIe fabric. As a result, there is no downtime for the system when expanding the system to include additional components.

Figure 25:
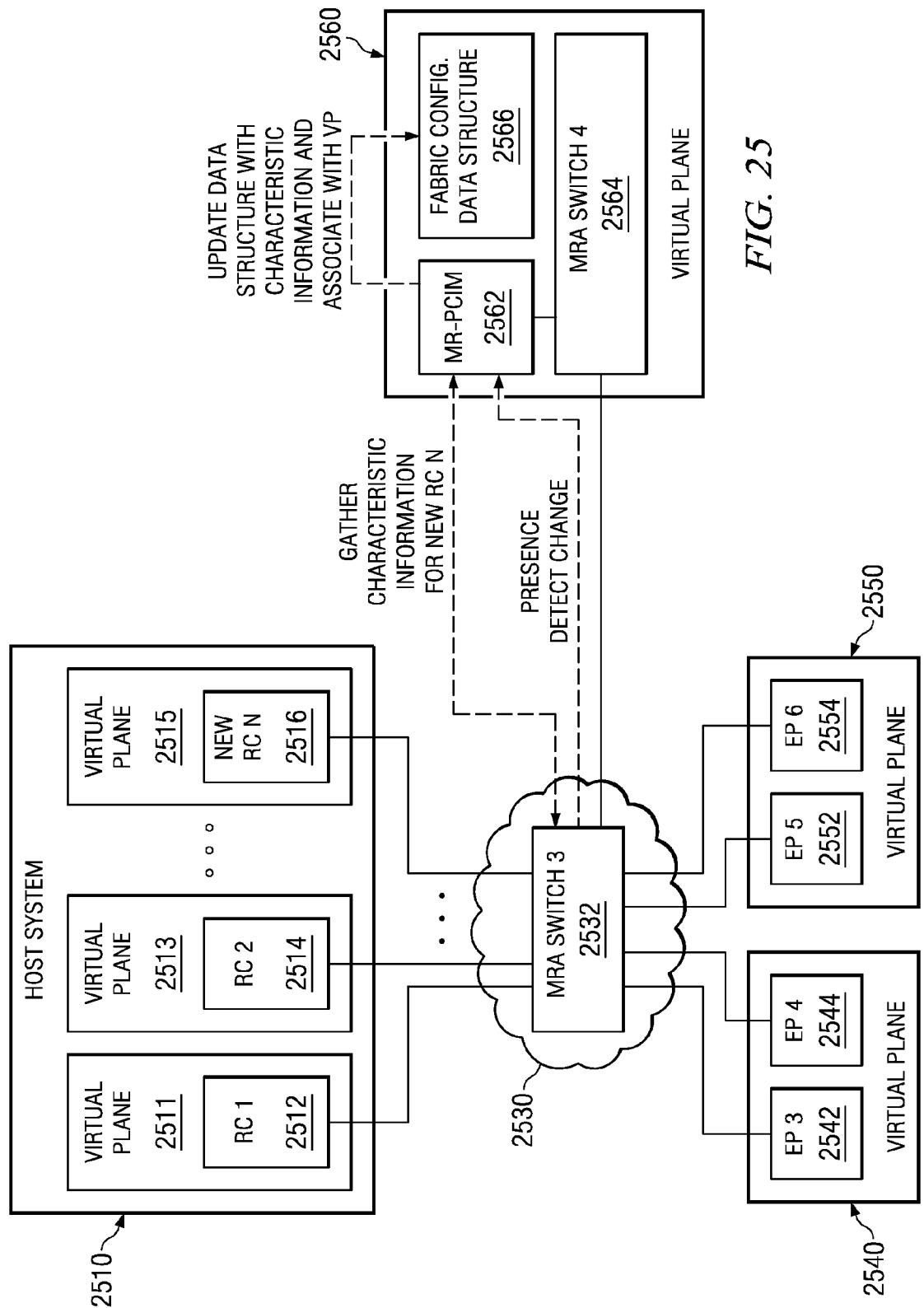
FIG. 25 is an exemplary block diagram illustrating a hot-plugin operation for a root complex in accordance with one illustrative embodiment.

FIG. 25 is an exemplary block diagram illustrating a hot-plugin operation for a root complex in accordance with one illustrative embodiment. It should be appreciated that while FIG. 25 shows the hot-plugin operation for a root complex, the illustrative embodiments are not limited to such. Rather, as discussed above, the hot-plug operation may be performed with regard to endpoints, switches, and other types of components without departing from the spirit and scope of the present invention.

As shown in FIG. 25, host system 2510 has existing root complexes RC1 2512 and RC2 2514 associated with virtual planes 2511 and 2513, respectively. The existing root complexes RC1 2512 and RC2 2514 are configured by the MR-PCIM 2562 to communicate with endpoints 2542, 2544, 2552, and 2554 in virtual planes 2540 and 2550. The MR-PCIM 2562 maintains a fabric configuration data structure 2566 which stores characteristic information for all of the components of the PCIe fabric 2530 and components attached to the PCIe fabric 2530, including the components of host system 2510.

In the depicted example, it is assumed that a new root complex RC N 2516 has been added to the host system 2510. For example, the root complex RC N 2516 may be associated with a blade and the host system 2510 may be a blade server having a chassis in which the blade associated with RC N 2516 may be inserted. Other types of devices that may supply RC N 2516 may be used without departing from the spirit and scope of the illustrative embodiments.

With the illustrative embodiments, there are two types of standard PCI hot-plug controllers associated with each switch port that is going to allow hot-plug/remove of components. One of these hot-plug controllers is used by the MR-PCIM 2562 for the physical aspects of the hot-plug/remove operations, and is referred to as the "physical hot-plug" controller. There is one of these physical hot-plug controllers for each hot-pluggable port.

In addition, a "virtual hot-plug" controller is provided for the root complexes which use the virtual hot-plug controller to control their logical connections to a shared component below a switch port. There is one virtual hot-plug controller per virtual plane supported by a switch port.

With the illustrative embodiments, in response to the addition of the new RC N 2516, the physical hot-plug controller at the switch 2532 port associated with RC N 2516 sends a "Presence Detect Change" interrupt message to the MR-PCIM 2562 to inform the MR-PCIM 2562 that a new component has been added to the PCIe fabric. This interrupt message is defined by the PCI specifications, but the usage here is to direct the interrupt to the MR-PCIM 2562 rather than to a root complex that does not run the MR-PCIM 2562. Alternatively, a system administrator may have also informed the MR-PCIM 2562 via a management interface (not shown) to the MR-PCIM 2562, prior to the insertion, as another form of notification of the addition of a new component.

The MR-PCIM 2562 may then handle the "Presence Detect Change" interrupt by performing a number of operations to initialize the new component, e.g., root complex RC N 2516, in the existing PCIe fabric 2530. For example, the MR-PCIM 2562 updates its fabric configuration data structure 2566 with information regarding the newly added component. In updating the fabric configuration data structure 2566, the MR-PCIM 2562 performs PCI configuration space operations to query and determine the characteristics of the newly added component, e.g., whether it is an endpoint, a root complex, a switch, etc., what type of endpoint, root complex, switch, etc. it is, vendor name, part number, serial number, and the like.

In addition to this automated query, when the added component is a root complex, the system administrator may tell the MR-PCIM 2562, such as through a management interface (not shown) to the MR-PCIM 2562, which components to configure to the newly added root complex. For example, MR-PCIM 2562 needs to know which endpoints the system administrator wants to assign to the new RC N 2516 so that those endpoints can be added to the correct virtual plane in order for the new RC N 2516 to have access to them. This assignment of endpoints to a virtual plane is done by the MR-PCI 2562 accessing PCI multi-root configuration structures in PCI configuration spaces of the MRA switch 2532 and, if the endpoints are MRA endpoints, in the endpoints, in addition to the MRA switch 2532.

In the depicted example, the new component that was added is a root complex RC N 2516, e.g., a blade providing RC N 2516. However, the component may be any of a number of different types of components and thus, the MR-PCIM 2562 may determine the type of component being added based on the characteristics information gathered from the added component. Based on the determined type of component that is being added, various operations may be performed by the MR-PCIM 2562 to dynamically add the component to the PCIe fabric 2530 such that it may be employed in communications and operations of the PCIe fabric 2530.

Since, in the depicted example, the added component is a new root complex RC N 2516, the MR-PCIM 2562 associates the new root complex RC N 2516 with a virtual plane 2515 and then associates the endpoints that the system administrator has specified to the new root complex RC N 2516, as detailed previously. In this way, the new component may be dynamically added to the PCIe fabric.

With the new root complex RC N 2516 having been added to the PCIe fabric 2530 by the MR-PCIM 2562, by including the characteristic information for the new root complex RC N 2516 in the fabric configuration data structure 2566, setting up the PCI configuration spaces of the components to be associated with the new root complex, and associating the new root complex with a virtual plane 2515, the new root complex RC N 2516 may be used in the PCIe fabric 2530. The above operation is performed dynamically while the PCIe fabric 2530 continues to function. Thus, the illustrative embodiments provide a mechanism for hot-plugging a component into a running PCIe fabric 2530.

It should be noted that the fabric configuration data structure 2566, which is kept current with the system configuration by the MR-PCIM 2562, can be used for a number of purposes. For example, it can be used to display to the system administrator, via the MR-PCIM's management interface, the I/O configuration of the PCIe fabric 2530. That is, a representation of which endpoints are assigned to which root complexes, which endpoints have not been assigned to any root complexes and thus are available to be assigned, and the like, may be provided to the system administrator via a management interface provided by the MR-PCIM 2562. The fabric configuration data structure 2566 may also be persisted across system power cycles in a non-volatile storage, such as flash memory or hard disk, so that when the system powers on, the previous assignments of endpoints to root complexes, as previously assigned by the system administrator, may be restored automatically by the MR-PCIM 2562.

The fabric configuration data structure 2566 is maintained with all the known information obtained from the I/O communication fabric 2530, the endpoint PCI configuration registers, and the information input by the system administrator via the management interface of the MR-PCIM 2562. The fabric configuration data structure 2566 identifies the tree structure of the I/O structure, and hence can be used to know which components will be removed when a removal operation is performed, as described below.

In the above example, a root complex was added. When this happens, the root complex's firmware and software, as part of the normal power-up operation, will probe the I/O configuration information in the fabric configuration data structure 2566 using normal PCI configuration accesses. When an endpoint is the component being added to a running I/O communication fabric 2530, once the system administrator has added the component to the desired root complex through the MR-PCIM's management interface, the MR-PCIM 2562, after configuring the endpoint to the desired virtual plane as described above, then signals the root complex that the endpoint has been added via the virtual hot-plug controller, previously mentioned. The root complex, as a result, receives an interrupt from the virtual hot-plug controller and initiates the software that will configure and start to use the new endpoint. Hence, an endpoint can be added without stopping the current system operations.

In addition, the mechanisms of the illustrative embodiments also provide functionality for dynamically removing components from the PCIe fabric 2530. Similar to the "Add" event, the MR-PCIM 2562 may be notified of a "Remove" event by a system administrator via an interface, automatic detection mechanism, or the like. With a "Remove" event, the event identifies to the MR-PCIM 2562 in which virtual tree branch of the virtual hierarchies, managed by the MR-PCIM 2562, the removal operation (i.e. the hot-plug removal of the component), has occurred or will occur.

In a removal operation, the components which are to be removed are identified by the fabric configuration data structure 2566. As mentioned previously, this fabric configuration data structure 2566 identifies a tree structure of the I/O components. The removal operation points to the component in the tree structure that is to be removed, and everything below that component will also be removed. For example, the component to be removed might be pointed to by a graphical management interface displayed to the system administrator via the MR-PCIM 2562 management interface. In which case, the MR-PCIM 2562 knows how that selected component is related to other components via the fabric configuration data structure 2566.

Alternatively, the relationships of the component may be identified by the status bits in a virtual hot-plug controller associated with the component. In this latter case, the virtual hot-plug controller may issue an interrupt message to the MR-PCIM 2562 which may then read the status from the virtual hot-plug controller's registers to see which components were to be removed. In such a case, the MR-PCIM 2562 may scan the fabric configuration data structure 2566 to find the component, in order to discover which components need to be removed.

Examples of a remove operation include the operation to remove endpoint EP5 2552, in which case, only that endpoint would be identified for removal based on the tree structure in the fabric configuration data structure 2566. As another example, the removal of MRA switch 3 2532, would involve the removal of MRA switch 3 2532 and endpoints EP3-EP6 2542-2554, based on tree structure of the fabric configuration data structure 2566.

The MR-PCIM 2562 handles the "Remove" event by updating its virtual PCIe fabric configuration data structure 2566 to remove the component associated with the "Remove" event and updating the PCI configuration spaces of the components in the tree branch or branches involved to remove them from the virtual plane that they previously occupied. After removal, endpoints may be returned to an unused component pool, and may be assigned later, by the system administrator, to another root complex. Specifically, if the component is an endpoint, as identified by the PCI configuration information in the fabric configuration data structure 2566, the MR-PCIM 2562 removes the endpoint from the virtual plane in the virtual tree hierarchy it was in. If the component is, or provides, a root complex, the virtual plane associated with the component is removed from all components that were part of that virtual plane. Thus, in addition to being able to dynamically add components to a PCIe fabric, the mechanisms of the illustrative embodiments further provide the ability to dynamically remove components from the PCIe fabric while the PCIe fabric is operating or running.

Figure 26:
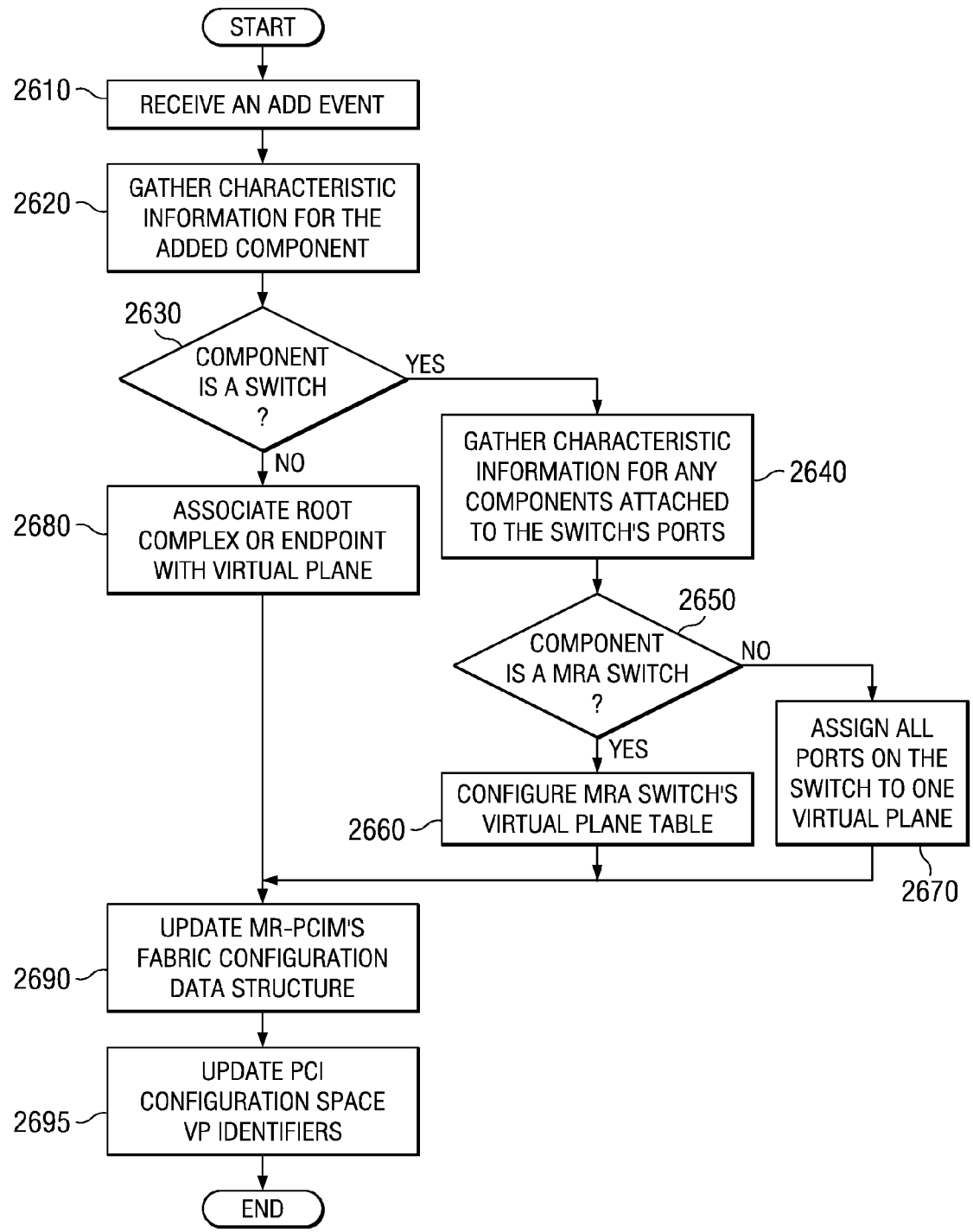
FIG. 26 is a flowchart outlining an exemplary operation for adding a component to a PCIe fabric in accordance with one illustrative embodiment.

FIG. 26 is a flowchart outlining an exemplary operation for adding a component to a PCIe fabric in accordance with one illustrative embodiment. As shown in FIG. 26, the operation starts by receiving, in a MR-PCIM, an "Add" event indicating the addition of a component to the PCIe fabric (step 2610). As discussed above, this event may identify the switch and switch port to which the component is added and may be generated in response to an automatic detection of the addition of the component or in response to a system administrator command input, for example. The "Add" event may be received as part of a "Presence Detect Change" interrupt sent by a physical hot-plug controller of a PCIe switch in response to the detection of the addition of the new component, for example.

The MR-PCIM gathers characteristic information for the added component (step 2620). This gathering may comprise communicating with the component to retrieve the characteristic information, such as from a VPD storage device associated with the component or the like. Moreover, the gathering may comprise the MR-PCIM performing PCI configuration space operations to determine these characteristics of the newly added component. The MR-PCIM determines, based on the gathered characteristic information, if the component is a switch (step 2630). If the component is a switch, then the MR-PCIM gathers characteristic information for any components attached to the switch's ports (step 2640). The MR-PCIM determines, based on the characteristic information for the component, if the switch is a MRA switch or a base switch (step 2650). If the switch is a MRA switch, the MR-PCIM configures the MRA switches virtual plane table (step 2660). If the switch is a base switch, the MR-PCIM assigns all ports on the switch to one virtual plane (step 2670).

If the component is not a switch, then the MR-PCIM determines that the component provides a new root complex or endpoint. The MR-PCIM associates the root complex or endpoint with a virtual plane (step 2680). The characteristic information for the component is then used to update the PCIe fabric configuration data structure associated with the MR-PCIM based on the associated virtual plane(s) (step 2690). This updating may comprise, for example, updating one or more virtual hierarchies maintained in the fabric configuration data structure. Finally, the MR-PCIM updates the PCI configuration space VP identifiers (step 2695). The operation then terminates.

Figure 27:
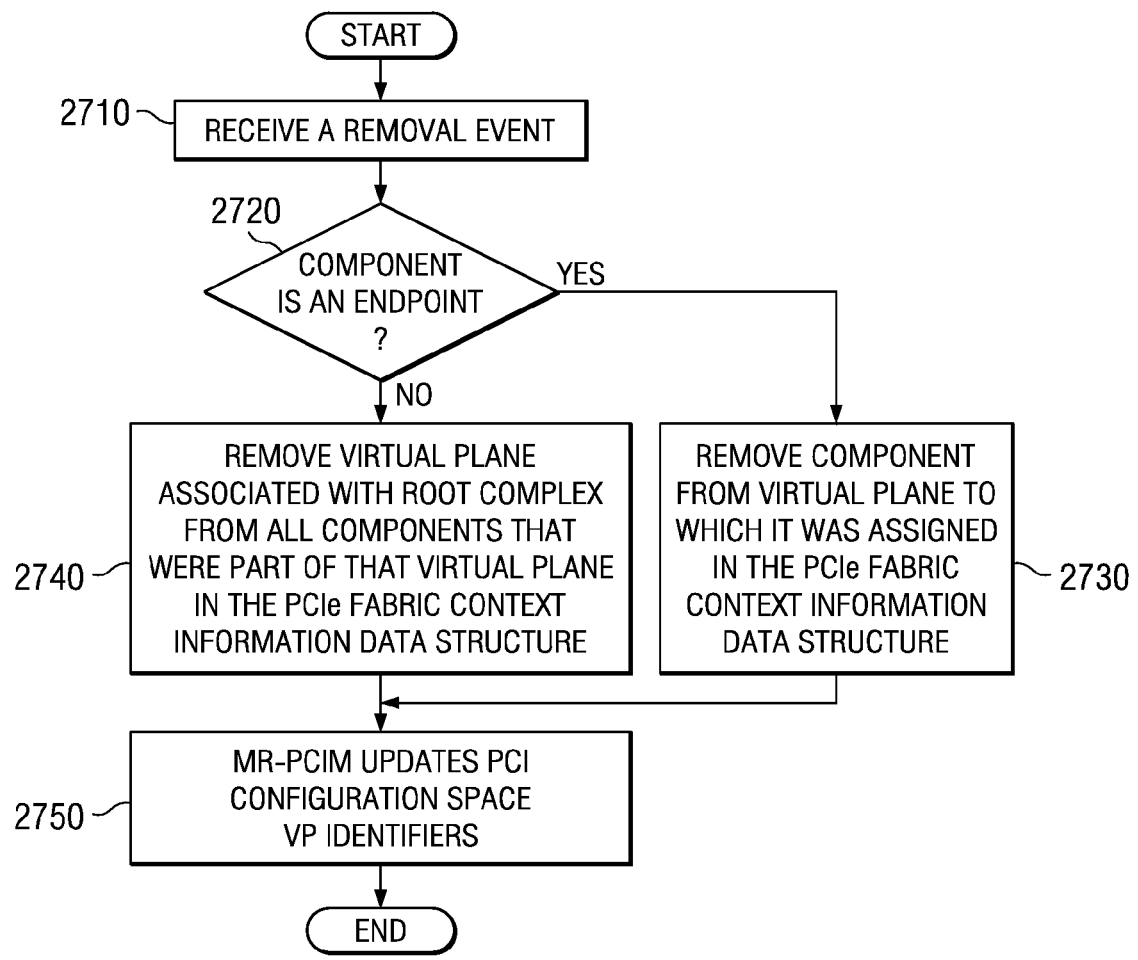
FIG. 27 is a flowchart outlining an exemplary operation for dynamically removing a component from a PCIe fabric in accordance with one illustrative embodiment.

FIG. 27 is a flowchart outlining an exemplary operation for dynamically removing a component from a PCIe fabric in accordance with one illustrative embodiment. As shown in FIG. 27, the operation starts with the MR-PCIM receiving a "Removal" event (step 2710). As discussed above, this event may be generated in response to an automatic detection of the removal of the component or in response to a system administrator command input, for example.

The MR-PCIM determines if the component that is being removed is an endpoint (step 2720). If the component is an endpoint, then the component is removed from the virtual plane to which it was assigned in the PCIe fabric configuration data structure associated with the MR-PCIM (step 2730). If the component is not an endpoint, then the component is a root complex. If the component is a root complex, the MR-PCIM removes the virtual plane associated with the root complex from all components that were part of that virtual plane in the PCIe fabric configuration data structure (step 2740). In addition to the component being removed from the MR-PCIM's fabric configuration data structure, MR-PCIM also issues PCI configuration operations to the affected components to update the VP numbers in the components (step 2750). The operation then terminates.

Thus, the mechanisms of the illustrative embodiments provide various functionalities for sharing endpoints across multiple system images and root complexes. These functionalities include the configuring of shared memory spaces for use in communicating between root complexes and endpoints, dynamically adding or removing root complexes and other components, and the like. These various mechanisms all add to a system's ability to expand as requirements change over time. Moreover, these various mechanisms enhance workload balancing, concurrent maintenance, and a plethora of other desired system capabilities.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for initializing a shared memory for communication between a plurality root complexes of the data processing system, comprising:

generating a first virtual hierarchy of components of a communication fabric in the data processing system, the first virtual hierarchy being associated with a first root complex of the data processing system;

generating a second virtual hierarchy of components of the communication fabric in the data processing system, the second virtual hierarchy being associated with a second root complex of the data processing system;

assigning a first address range in a first shared memory associated with the first root complex, for a given endpoint in the second virtual hierarchy, wherein the first address range is accessible by a first host system associated with the first root complex as memory mapped input/output, wherein the given endpoint is co-resident with the second root complex as indicated by a co-residency field associated with a hardware device that holds the second root complex and the given endpoint;

assigning a second address range in a second shared memory associated with the second root complex, for the given endpoint in the second virtual hierarchy, wherein the second address range is accessible by a second host system associated with the second root complex through real addresses of the second host system; and performing communication from the first host system associated with the first root complex to the second host system associated with the second root complex by writing, by the first host system, to the first address range in the first shared memory and performing, by the given endpoint, at least one direct memory access operation, wherein each of the at least one direct memory access operation accesses the first address range in the first shared memory and places a result in the second address range in the second shared memory.

2. The method of claim 1, wherein generating the first virtual hierarchy and generating the second virtual hierarchy, comprises:
traversing links in the communication fabric to discover the components of the communication fabric;
storing identification data for the components of the communication fabric; and
generating the first and second virtual hierarchies based on the stored identification data.

3. The method of claim 2, wherein generating the first and second virtual hierarchies based on the stored identification data comprises:
comparing the identification data for each endpoint component with identification data for each root complex component discovered during traversing of the links in the communication fabric;
setting a co-residency field value associated with an endpoint component if the identification data for the endpoint component matches identification data for a root complex component; and
generating the first and second virtual, hierarchies based on co-residency field values associated with endpoint components of the communication fabric.

4. The method of claim 1, wherein the communication fabric is a peripheral component interconnect express (PCIe) fabric and the endpoints are PCIe adapters.

5. The method of claim 1, wherein the generating and assigning operations are performed by single root peripheral component interconnect managers (SR-PCIMs) associated with the respective first and second root complexes.

6. The method of claim 5, wherein the SR-PCIMs assign, for each endpoint of a corresponding virtual hierarchy, a base address and limit within a PCI memory address space to which the endpoint belongs, and wherein the SR-PCIMs write the base address and limit to a Base Address Register (BAR) of the endpoint.

7. The method of claim 5, wherein the SR-PCIMs individually configure shared memories associated with their respective root complexes based on only the virtual hierarchy associated with their respective root complexes, and wherein the SR-PCIMs generate the virtual hierarchies based on information gathered by a multiple root peripheral component interconnect manager (MR-PCIM) that traverses all of the links of the communication fabric and identifies associations between endpoints and root complexes present in the communication fabric.

8. The method of claim 1, wherein the data processing system is a blade server and wherein the host systems are blades of the blade server.

9. The method of claim 1, wherein the communication fabric is a multiple root aware communication fabric comprising one or more multiple root: aware (MRA) switches.

10. The method of claim 1, wherein at least one endpoint has an associate address range in both the first shared memory and the second shared memory such that the at least one endpoint is shared between the first root complex and the second root complex.

11. The method of claim 1, wherein performing communication between the first root complex and the second root complex utilizing the assigned address ranges in the first and second shared memories comprises utilizing an address translation and protection table data structure to map addresses associated with one of the first or second shared memories to addresses associated with an other of the first or second shared memories.

12. The method of claim 1, wherein communication between the first host system and second host system is performed between the first root complex and the given endpoint.

13. The method of claim 1, further comprising:
assigning an address range in the first shared memory associated with the first root complex, for each root complex in the first virtual hierarchy; and
assigning an address range in the second shared memory associated with the second root complex, for each root complex in the second virtual hierarchy, wherein communication between the first host system and the second host system is performed directly between the first root complex and the second root complex.

14. A computer program product comprising a non-transitory computer useable medium having a computer readable program recorded thereon, wherein the computer readable program, when executed in a data processing system, causes the data processing system to:
generate a first virtual hierarchy of components of a communication fabric in the data processing system, the first virtual hierarchy being associated with a first root complex of the data processing system;
generate a second virtual hierarchy of components of the communication fabric in the data processing system, the second virtual hierarchy being associated with a second root complex of the data processing system;
assign a first address range in a first shared memory associated with the first root complex, for a given endpoint in the second virtual hierarchy, wherein the first address range is accessible by a first host system associated with the first root complex as memory mapped input/output, wherein the given endpoint is co-resident with the second root complex as indicated by a co-residency field associated with a hardware device that holds the second root complex and the given endpoint;
assign a second address range in a second shared memory associated with the second root complex, for the given endpoint in the second virtual hierarchy, wherein the second address range is accessible by a second host system associated with the second root complex through real addresses of the second host system; and
perform communication from the first host system associated with the first root complex to the second host system associated with the second root complex by writing, by the first host system, to the first address range in the first shared memory and performing, by the given endpoint, at least one direct memory access operation, wherein each of the at least one direct memory access operation accesses the first address range in the first shared memory and places a result in the second address range in the second shared memory.

15. The computer program product of claim 14, wherein the computer readable program causes the data processing system to generate the first virtual hierarchy and generating the second virtual hierarchy, by:
traversing links in the communication fabric to discover the components of the communication fabric;
storing identification data for the components of the communication fabric; and
generating the first and second virtual hierarchies based on the stored identification data.

16. The computer program product of claim 15, wherein the computer readable program causes the data processing system to generate the first and second virtual hierarchies based on the stored identification data by:

comparing the identification data for each endpoint component with identification data for each root complex component discovered during traversing of the links in the communication fabric;

setting a co-residency field value associated with an endpoint component if the identification data for the endpoint component matches identification data for a root complex component; and generating the first and second virtual hierarchies based on co-residency field values associated with endpoint components of the communication fabric.

17. The computer program product of claim 14, wherein the communication fabric is a peripheral component interconnect express (PCIe) fabric and the endpoints are PCIe adapters.

18. The computer program product of claim 14, wherein the computer readable program causes the data processing system to perform the generate and assign operations using single root peripheral component interconnect managers (SR-PCIMs) associated with the respective first and second root complexes.

19. The computer program product of claim 18, wherein the SR-PCIMs assign, for each endpoint of a corresponding virtual hierarchy, a base address and limit within a PCI memory address space to which the endpoint belongs, and wherein the SR-PCIMs write the base address and limit to a Base Address Register (BAR) of the endpoint.

20. The computer program product of claim 18, wherein the SR-PCIMs individually configure shared memories associated with their respective root complexes based on only the virtual hierarchy associated with their respective root complexes, and wherein the SR-PCIMs generate the virtual hierarchies based on information gathered by a multiple root peripheral component interconnect manager (MR-PCIM)-that traverses all of the links of the communication fabric and identifies associations between endpoints and root complexes present in the communication fabric.

21. The computer program product of claim 14, wherein the data processing system is a blade server and wherein the host systems are blades of the blade server.

22. The computer program product of claim 14, wherein the communication fabric is a multiple root aware communication fabric comprising one or more multiple root aware (MRA) switches.

23. The computer program product of claim 14, wherein at least one endpoint has an associate address range in both the first shared memory and the second shared memory such that the at least one endpoint is shared between the first root complex and the second root complex.

24. The computer program product of claim 14, wherein the computer readable program causes the data processing system to perform communication between the first root complex and the second root complex utilizing the assigned address ranges in the first and second shared memories by utilizing an address translation and protection table data structure to map addresses associated with one of the first or second shared memories to addresses associated with an other of the first or second shared memories.

25. The computer program product of claim 14, wherein the computer readable program further causes the data processing system to:

assign an address range in the first shared memory associated with the first root complex, for each root complex in the first virtual hierarchy; and assign an address range in the second shared memory associated with the second root complex, for each root complex in the second virtual hierarchy, wherein communication between the first host system and the second host system is performed directly between the first root complex and the second root complex.

26. The computer program product of claim 14, wherein communication between the first host system and second host system is performed between the first root complex and the given endpoint.

27. A data processing system comprising:

a first host system, the first host system comprising a first root complex;

a second host system, the second host system comprising a second root complex; and a communication fabric coupling the first host system to the second host system, wherein:

the first host system generates a first virtual hierarchy of components of the communication fabric, the first virtual hierarchy being associated with the first root complex;

the second host system generates a second virtual hierarchy of components of the communication fabric, the second virtual hierarchy being associated with the second root complex;

the first host system assigns a first address range in a first shared memory associated with the first root complex, for a given endpoint in the second virtual hierarchy, wherein the first address range is accessible by the first host system as memory mapped input/output, wherein the given endpoint is co-resident with the second root complex as indicated by a co-residency field associated with a hardware device that holds the second root complex and the given endpoint;

the second host system assigns a second address range in a second shared memory associated with the second root complex, for the given endpoint in the second virtual hierarchy, wherein the second address range is accessible by the second host system through real addresses of the second host system; and communication is performed from the first host system to the second host system by writing, by the first host system, to the first address range in the first shared memory and performing, by the given endpoint, at least one direct memory access operation, wherein each of the at least one direct memory access operation accesses the first address range in the first shared memory and places a result in the second address range in the second shared memory.

28. The data processing system of claim 27, wherein the first host system generates the first virtual hierarchy and the second host system generates the second virtual hierarchy, by:

traversing links in the communication fabric to discover the components of the communication fabric;

storing identification data for the components of the communication fabric; and generating the first and second virtual hierarchies based on the stored identification data.

29. The data processing system of claim 28, wherein the first host system generates the first virtual hierarchy and the second host system generates the second virtual hierarchy based on the stored identification data by:

comparing the identification data for each endpoint component with identification data for each root complex component discovered during traversing of the links in the communication fabric;

setting a co-residency field value associated with an endpoint component if the identification data for the endpoint component matches identification data for a root complex component; and generating the first and second virtual hierarchies based on co-residency field values associated with endpoint components of the communication fabric.

30. The data processing system of claim 28, wherein the communication fabric is a peripheral component interconnect express (PCIe) fabric and the endpoints are PCIe adapters.

31. The data processing system of claim 28, wherein first host system and the second host system perform the generate and assign operations using single root peripheral component interconnect managers (SR-PCIMs) associated with the respective first and second root complexes.

32. The data processing system of claim 31, wherein the SR-PCIMs assign, for each endpoint of a corresponding virtual hierarchy, a base address and limit within a PCI memory address space to which the endpoint belongs, and wherein the SR-PCIMs write the base address and limit to a Base Address Register (BAR) of the endpoint.

33. The data processing system of claim 31, wherein the SR-PCIMs individually configure shared memories associated with their respective root complexes based on only the virtual hierarchy associated with their respective root complexes, and wherein the SR-PCIMs generate the virtual hierarchies based on information gathered by a multiple root peripheral component interconnect manager (MR-PCIM) that traverses all of the links of the communication fabric and identifies associations between endpoints and root complexes present in the communication fabric.

34. The data processing system of claim 27, wherein at least one endpoint has an associate address range in both the first shared memory and the second shared memory such that the at least one endpoint is shared between the first root complex and the second root complex.

35. The data processing system of claim 27, wherein the data processing system is a blade server and wherein the host systems are blades of the blade server.

* * * * *